United States Patent [19]
Kono et al.

[11] Patent Number: 5,627,750
[45] Date of Patent: May 6, 1997

[54] CLUTCH SLIP CONTROL DEVICE AND METHOD OF MANUFACTURING THE SAME, CLUTCH SLIP CONTROL METHOD, AND VEHICLE CONTROL DEVICE

[75] Inventors: Katsumi Kono; Hiroshi Ito; Kagenori Fukumura, all of Toyota; Shinya Nakamura, Asahi; Masataka Osawa, Nagoya; Ryoichi Hibino, Aichi-ken; Masatoshi Yamada, Nagoya, all of Japan

[73] Assignees: Toyota Jidosha Kabushiki Kaisha, Toyota; Kabushiki Kaisha Toyota Chuo Kenkyusho, Aichi-ken, both of Japan

[21] Appl. No.: 365,797

[22] Filed: Dec. 29, 1994

[30] Foreign Application Priority Data

Dec. 29, 1993 [JP] Japan ................................ 5-354656
Jul. 22, 1994 [JP] Japan ................................ 6-191988

[51] Int. Cl.$^6$ ............................ F16H 61/00; B60K 41/02; G05B 13/00
[52] U.S. Cl. .................... 364/424.096; 364/148; 364/165; 477/86; 477/176
[58] Field of Search ................. 364/424.1, 148, 364/149, 150, 151, 164, 165; 477/62, 63, 64, 65, 70, 77, 78, 79, 80, 86, 166, 174, 175, 176

[56] References Cited

U.S. PATENT DOCUMENTS

| | | | |
|---|---|---|---|
| 4,634,494 | 1/1987 | Moulds, III et al. | 364/150 X |
| 4,639,853 | 1/1987 | Rake et al. | 364/149 |
| 4,706,790 | 11/1987 | Lockhart et al. | 364/424.1 X |
| 5,121,820 | 6/1992 | Brown et al. | 364/424.1 X |
| 5,202,833 | 4/1993 | Fodale | 364/424.1 |
| 5,275,267 | 1/1994 | Slicker | 477/176 |
| 5,322,150 | 6/1994 | Schmidt-Bruecken et al. | 477/176 |
| 5,404,289 | 4/1995 | Hang et al. | 364/148 |
| 5,406,474 | 4/1995 | Hansen | 364/148 |
| 5,474,506 | 12/1995 | Palansky et al. | 477/63 |
| 5,480,363 | 1/1996 | Matsubara et al. | 477/63 |
| 5,519,605 | 5/1996 | Cawlfield | 364/151 |
| 5,527,238 | 6/1996 | Hrovat et al. | 477/166 |

FOREIGN PATENT DOCUMENTS

| | | |
|---|---|---|
| 61-52427 | 3/1986 | Japan . |
| 63-67461 | 3/1988 | Japan . |
| 64-30966 | 2/1989 | Japan . |
| 2-180365 | 7/1990 | Japan . |

OTHER PUBLICATIONS

Robust–Control Toolbox User's Guide, Jun. 1, 1988, Richard Y. Chiang, et al., "Robust–Control Toolbox: A Tutorial", pp. R–3–R–13 and R–28–R29.

*Primary Examiner*—Collin W. Park
*Attorney, Agent, or Firm*—Oblon, Spivak, McClelland, Maier & Neustadt, P.C.

[57] ABSTRACT

A clutch slip control device includes: a slip revolution speed detecting circuit for detecting an actual slip revolution speed of a clutch; a memory unit for storing constants set to satisfy response and stability of a feedback control system of the slip conditions, the constants being determined by a high-order function approximating variation in input-output frequency characteristics of a plant input for actuating the clutch and the actual slip revolution speed; a first calculation circuit for calculating a first parameter using the constants stored in the memory unit, the first parameter discretely reflecting past data of the plant input, which are obtained in a current feedback control cycle through in a cycle executed a plurality of times before; a second calculation circuit for calculating a second parameter using the constants stored in the memory unit, the second parameter discretely reflecting past data of a deviation of the actual slip revolution speed from a target slip revolution speed, which are obtained in the current feedback control cycle through in the cycle executed a plurality of times before; and a plant input determination circuit for determining a next plant input based on the first parameter and the second parameter.

9 Claims, 29 Drawing Sheets

32: LOCK-UP CLUTCH (DIRECT CLUTCH)
42: ELECTRONIC CONTROL UNIT (SLIP CONTROL DEVICE)
90: ENGINE SPEED SENSOR (ENGINE SPEED DETECTING MEANS)

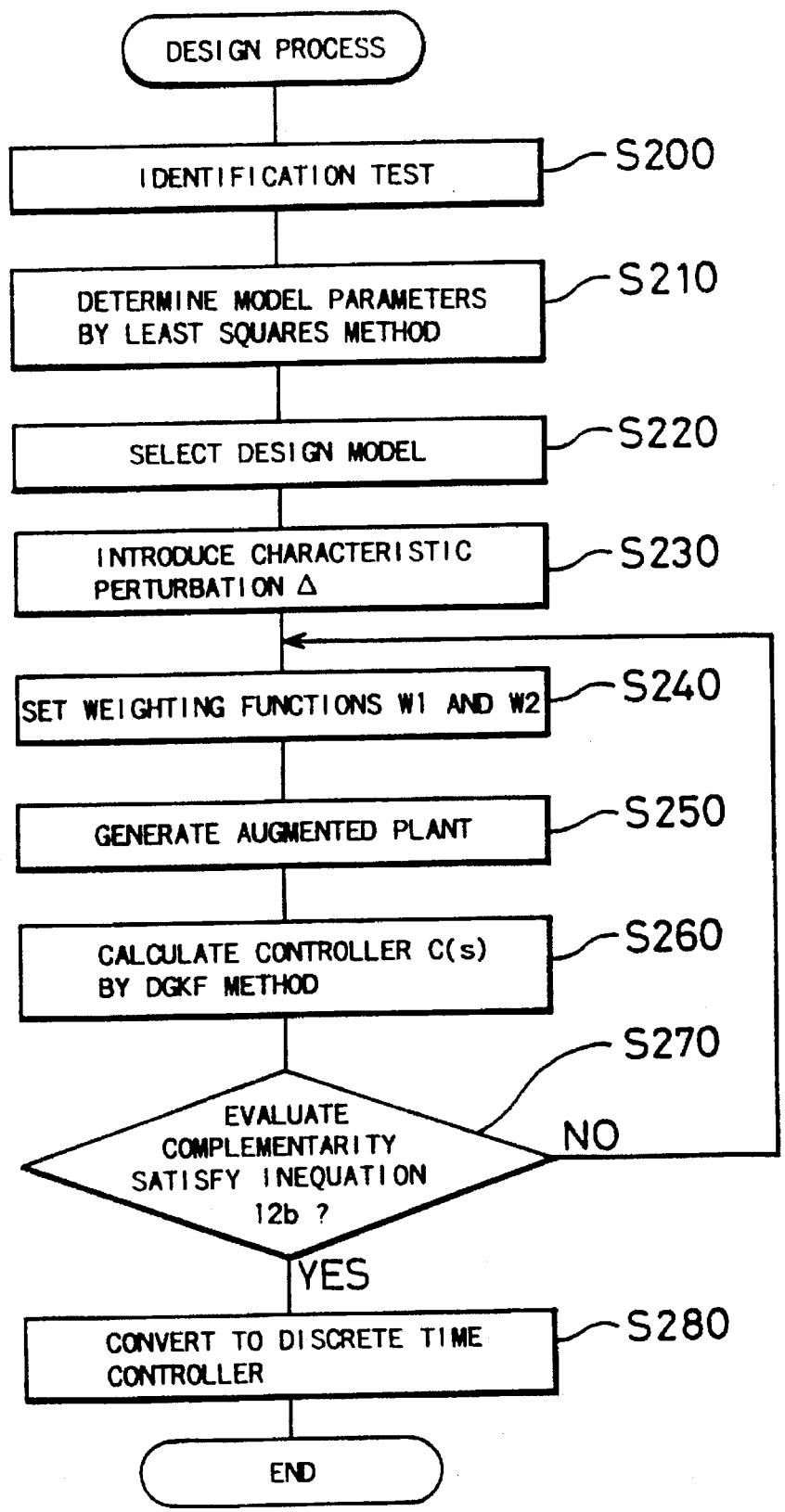

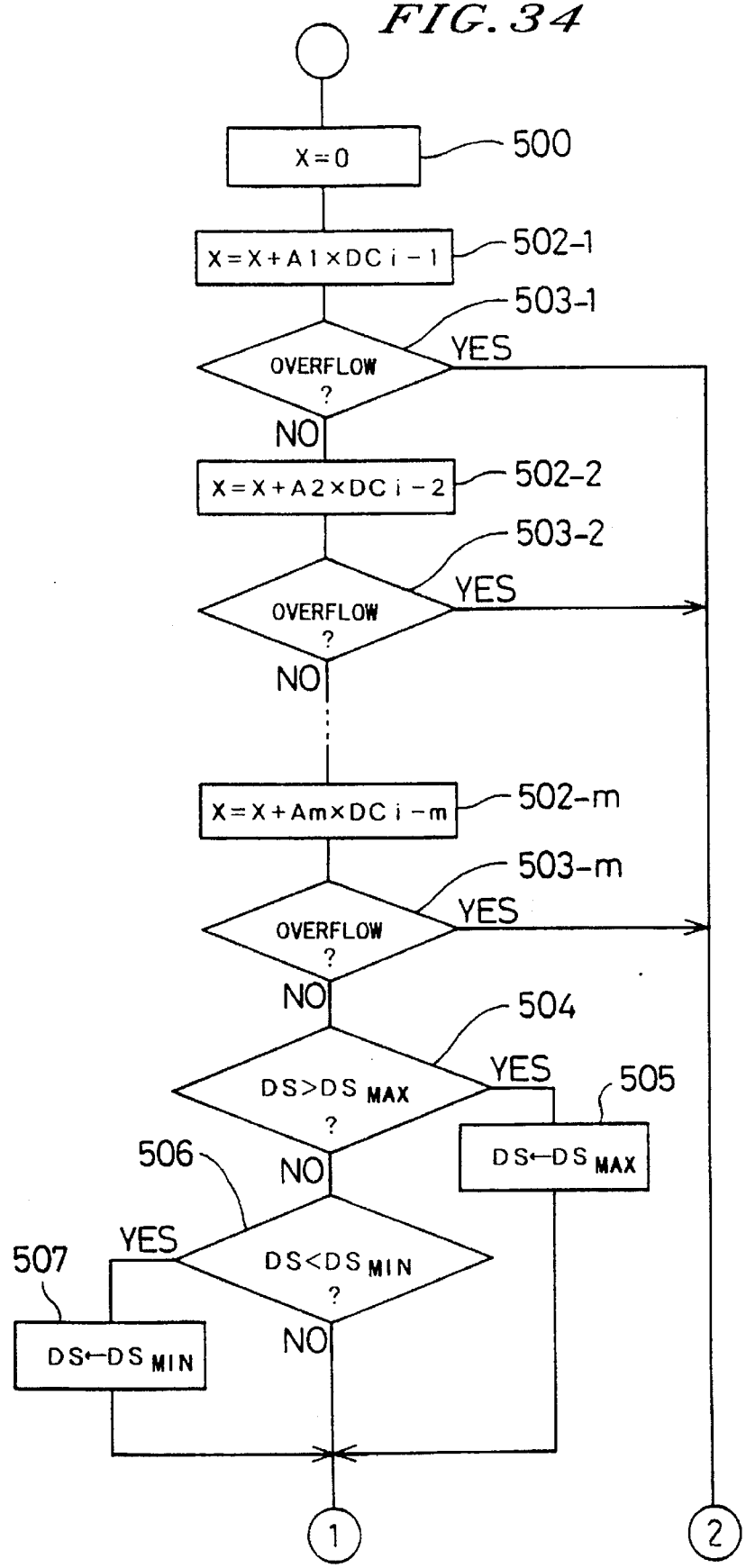

5,627,750

CLUTCH SLIP CONTROL DEVICE AND METHOD OF MANUFACTURING THE SAME, CLUTCH SLIP CONTROL METHOD, AND VEHICLE CONTROL DEVICE

BACKGROUND OF THE INVENTION

1. Field of the Invention

The present invention relates to a clutch slip control device, a method of slip control, a method of manufacturing the slip control device, and a vehicle control system applicable thereto. More specifically, the invention pertains to a system of outputting a plant input of clutch operation to make an actual slip revolution speed coincident with a target slip revolution speed and adjusting slip conditions based on the plant input thus output.

2. Description of the Related Art

A variety of known clutch slip control devices include those for controlling slip conditions of a lock-up clutch of a torque converter. Such slip control devices are designed to solve contradictory problems, that is, connection of inputs with outputs of the torque converter transmits the vibrations of an engine directly to a transmission in a range of low engine speed, thus worsening the riding comfortableness whereas disconnection of inputs and outputs in a wide range of engine speed prevents sufficient reduction of the fuel consumption rate.

Improvement has been conventionally given to these slip control devices to reconcile the high response and control stability. One example of proposed improvement includes a process of calculating a current plant input based on a deviation of the actual slip revolution speed from a target slip revolution speed and a differential and an integral of the deviation or a differential and a second differential of the deviation (JAPANESE PATENT PUBLICATION GAZETTE No. H2-586). Another example includes a process of expanding these quantities in time series to calculate an increase in the plant input (JAPANESE PATENT LAYING-OPEN GAZETTE No. S64-30966). By matching the characteristics of the control devices to those of a plant or slip adjusting mechanism, these improved control devices can stably regulate and maintain the slip quantity equal to or close to a target value and realize the high follow-up ability over the target value without lowering the stability.

These control devices, however, still have a drawback, that is, insufficient control over characteristic perturbations in a control system of clutch slip conditions. When there is a significant difference in properties between individual lock-up clutches and slip-regulating hydraulic control systems or when deterioration of frictional material or operating oil varies the frictional characteristics of the lock-up clutch or µ-v characteristics of the clutch from the initial design conditions to damage the stability of the slip revolution speed, the conventional control devices can not stably or rapidly control the slip quantity equal to or close to the target value. This problem is described more in detail with the drawings of FIGS. 37 through 39.

Characteristic perturbations of the slip control system are illustrated as the gain and phase of a transfer function from a plant input to a slip revolution speed. FIG. 37 is a graph showing a difference in design properties between individual clutches. The characteristics of clutches are differed by instability or pressing orientation of the frictional material especially in a high frequency domain. When the frictional material is worn or operating oil deteriorates thermally over time, both the gain and phase characteristics lower from the initial design properties in medium and high frequency domains as shown in FIGS. 38A and 38B. The frictional characteristics may have a resonance peak in the high frequency domain as illustrated in FIG. 39. Under such conditions, the frictional material may display the so-called stick-slip behavior (repetition of contact, revolution, and separation) and further cause self-oscillation. This results in total damage of the control stability of the slip revolution speed.

The above problem is ascribed to the design principle of the conventional control devices. These control devices are designed to satisfy the stability and follow-up properties of control under only specific control conditions or on the assumption that the control characteristics of the clutch are not significantly varied. Possible improvement given to the control device which calculates the current plant input based on the deviation of the actual slip revolution speed from a target slip revolution speed and the differential and second differential of the deviation is changing the constants of control expressions according to the characteristic perturbations of the control system. Such improvement, however, makes the structure of the control system undesirably complicated while not ensuring the stability of the change-over algorithm.

The problems of characteristic perturbations always exists in real systems. In order to guarantee the stability of control, the actual control devices have only the slow response. Although the slow response control stably maintains the slip revolution speed substantially equal to the target slip revolution speed under stationary driving conditions, it can not block the input torque variations of the engine or enhance the transmission efficiency of the torque following the transient driving conditions which causes a variation in the target slip revolution speed.

Another problem addressed by the invention is the stability of a real control system. Although a variety of control principles based on the control theories are available presently, digital control with a microcomputer is generally applied to a slip control system. The microcomputer-based control in a finite time scale causes several problems, quantizing errors in data processing, errors in processing of operation data, and noise errors included in input data. It is accordingly important to guarantee the stability over such errors. The fixed decimal point operation which is often applied to shorten the operation time drastically lowers the precision of small data obtained by the operation while causing an overflow of large numerical data to make the operation results totally useless. In many cases, the floating decimal point operation can not be applied because of the limited microcomputer functions and the restricted operation time. Prevention of divergence of oscillation of control and guarantee of the stability are essential factors in design of the actual control device.

SUMMARY OF THE INVENTION

One object of the invention is thus to provide a clutch slip control device which maintains the stability over characteristic perturbations and realizes the quick follow-up in slip control procedures.

Another object of the invention is to provide a method of readily designing and manufacturing such a clutch slip control device.

Still another object of the invention is to provide a method of slip control which guarantees the stability of slip control over characteristic perturbations and attains the quick follow-up of slip control.

Still another object of the invention is to provide a control device maintains the stability and responsiveness even under the transition condition and characteristic transformation by ages.

The above and other related objects are realized by a clutch slip control device having slip revolution speed detecting means for detecting an actual slip revolution speed of a clutch. The clutch slip control device comprises:

slip revolution speed detecting means for detecting an actual slip revolution speed of a clutch;

memory means for storing constants set to satisfy response and stability of a feedback control system of slip conditions, the constants being determined by a high-order function approximating variation in input-output frequency characteristics of a plant input for actuating the clutch and the actual slip revolution speed;

first calculation means for calculating a first parameter using the constants stored in the memory means, the first parameter discretely reflecting past data of the plant input, which are obtained in a current feedback control cycle through in a cycle executed a plurality of times before;

second calculation means for calculating a second parameter using the constants stored in the memory means, the second parameter discretely reflecting past data of a deviation of the actual slip revolution speed from a target slip revolution speed, which are obtained in the current feedback control cycle through in the cycle executed a plurality of times before; and plant input determination means for determining a next plant input based on the first parameter and the second parameter calculated by the first calculation means and the second calculation means, so as to make the actual slip revolution speed coincident with the target slip revolution speed, thereby adjusting slip conditions of the clutch based on the plant input.

The invention is also directed to a vehicle control device which is used to guarantee the stability in limited operating functions of a vehicle. The vehicle control device comprises:

control target detecting means for detecting an actual control quantity of a plant or control target which is mounted on a vehicle;

memory means for storing constants set to satisfy response and stability of a feedback control system of conditions of the plant, the constants being determined by a high-order function approximating variation in input-output frequency characteristics of a plant input and the actual control quantity;

first calculation means for calculating a first parameter using the constants stored in the memory means, the first parameter discretely reflecting past data of the plant input, which are obtained in a current feedback control cycle through in a cycle executed a plurality of times before;

second calculation means for calculating a second parameter using the constants stored in the memory means, the second parameter discretely reflecting past data of a deviation of the actual control quantity from a target control quantity, which are obtained in the current feedback control cycle through in the cycle executed a plurality of times before;

plant input determination means for determining a next plant input based on the first parameter and the second parameter calculated by the first calculation means and the second calculation means, so as to make the actual control quantity coincident with the target control quantity;

out-of-range detecting means for detecting that at least one of the first parameter and the second parameter is out of a predetermined allowable range and outputting a detecting result; and setting means for setting the next plant input equal to a fixed value and initializing at least the first parameter in response to the result outputted by the out-of-range detecting means, thereby controlling the plant based on the plant input.

In this structure, when at least one of the first parameter and the second parameter is out of the predetermined allowable range, the plant input is set equal to zero or another fixed value whereas at least the first parameter is initialized. This structure does not take data affected by a uniformly-set guarding threshold into the feedback control, thereby preventing results of operations, that is, the parameters and the plant input, from diverging or oscillating but ensuring convergence of the operation results. These effects are also attained by the structures described below.

The structure of the vehicle control device may be applied to a slip control device. The slip control device further comprises:

out-of-range detecting means for detecting that at least one of the first parameter and the second parameter is out of a predetermined allowable range and outputting a detecting result; and setting means for setting next the plant input equal to a fixed value and initializing the first parameter and the second parameter in response to the result outputted by the out-of-range detecting means.

The invention is also directed to another clutch slip control device, which further con, rises:

out-of-range detecting means for detecting that the next plant input determined by the plant input determination means is out of a predetermined allowable range and outputting a detecting result; and threshold setting means for setting the next plant input and the first parameter equal to predetermined threshold values in response to the result outputted by the out-of-range detecting means.

The objects of the invention are also realized by a method of clutch slip control including the steps of:

(a) detecting an actual slip revolution speed of a clutch;

(b) storing constants set to satisfy response and stability of a feedback control system of slip conditions, the constants being determined by a high-order function approximating variation in input-output frequency characteristics of a plant input for actuating the clutch and the actual slip revolution speed;

(c) calculating a first parameter using the constants stored in the step (b), the first parameter discretely reflecting past data of the plant input, which are obtained in a current feedback control cycle through in a cycle executed a plurality of times before;

(d) calculating a second parameter using the constants stored in the step (b), the second parameter discretely reflecting past data of a deviation of the actual slip revolution speed from a target slip revolution speed, which are obtained in the current feedback control cycle through in the cycle executed a plurality of times before; and (e) determining a next plant input based on the first parameter and the second parameter calculated in the steps (c) and (d), so as to make the actual slip revolution speed coincident with a target slip revolution speed, thereby adjusting slip conditions of the clutch based on the plant input.

The invention is also directed to a method of manufacturing a slip control device which outputs an actuating signal or plant input given to a clutch so as to make an actual slip revolution speed coincident with a target slip revolution speed and adjusts slip conditions of the clutch based on the plant input. The method includes the steps of:

(a) measuring characteristic perturbations of a slip-conditions feedback control system on a plurality of factors causing the characteristic perturbations, and approximating a total of the characteristic perturbations due to the plurality of factors as a first high-order weighting function;

(b) evaluating a first value and a second value as conditions for making the feedback control system stable over the characteristic perturbations,
the first value being determined by taking account of the first high-order weighting function and a transfer function from the target slip revolution speed to the actual slip revolution speed, and
the second value being determined by taking account of a transfer function from the target slip revolution speed to a control deviation and a second weighting function set for guaranteeing response of the feedback control system; and (c) determining constants for calculating a control amount of the feedback control system based on the result of the evaluation in the step (b).

According to one preferable application of the invention, the step (b) further evaluates a third value, the third value being determined by taking account of a transfer function from a torque variation or torque disturbance, which is applied to the feedback control system to vary the slip revolution speed, to the actual slip revolution speed, as well as the first high-order weighting function, the second weighting function, and the transfer function from the target slip revolution speed to the control deviation.

These and other objects, features, aspects, and advantages of the present invention will become more apparent from the following detailed description of the preferred embodiments with the accompanying drawings.

BRIEF DESCRIPTION OF THE DRAWINGS

FIG. 1 schematically shows a vehicle power transmission system which a slip control device for a lock-up clutch embodied in the invention is applied to;

FIG. 20 is a flowchart showing concrete steps of designing the slip control device of the first embodiment;

FIGS. 34 through 36 are flowcharts showing concrete steps of a control routine executed in the fourth embodiment;

DESCRIPTION OF THE PREFERRED EMBODIMENT

Figure 1:
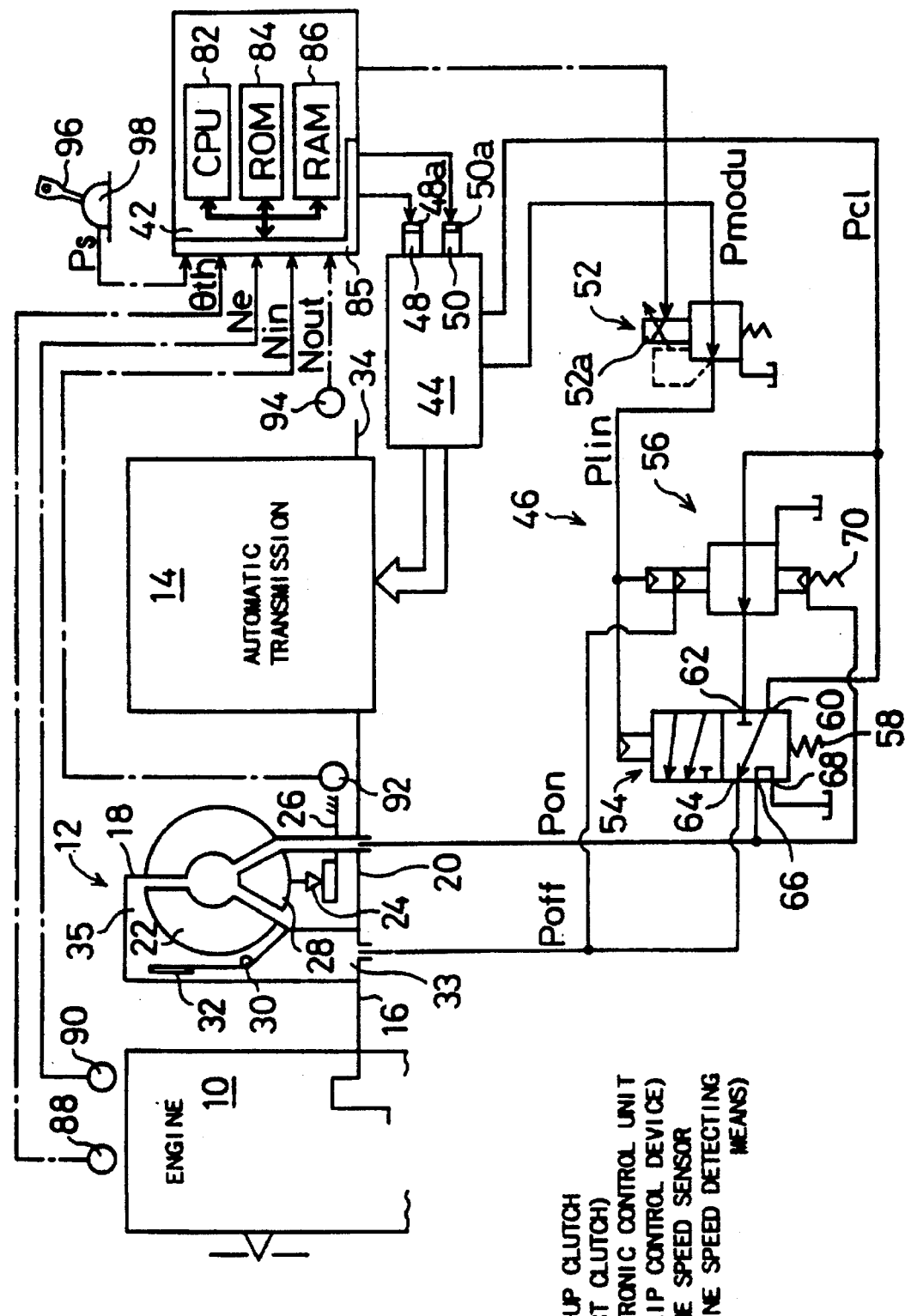

AS illustrated in FIG. 1, power of an engine 10 is transmitted to driving wheels via a stepped automatic transmission 14 including a torque converter 12 with a lock-up clutch and three sets of planetary gear units and a differential gear unit (not shown).

The torque converter 12 is fixed to a pump impeller 18 coupled with a crank shaft 16 of the engine 10 and with an input shaft 20 of the automatic transmission 14. The torque converter 12 is provided with a turbine runner 22 rotating with oil supplied from the pump impeller 18, a stator 28 fixed to a non-rotating housing element 26 via a one-way clutch 24, and a lock-up clutch 32 coupled with the input shaft 20 via a damper 30. The lock-up clutch 32 directly connects the input and output elements of the torque converter 12, that is, the crank shaft 16 and the input shaft 20, with each other. While the oil pressure in an engagement oil chamber 35 of the torque converter 12 is higher than the oil pressure in a release oil chamber 33, the lock-up clutch 32 is held in an engagement condition to transmit rotations of the crank shaft 16 directly to the input shaft 20. Upon condition that the oil pressure in the release oil chamber 33 of the torque converter 12 is higher than the oil pressure in the engagement oil chamber 35, on the contrary, the lock-up clutch 32 is held in a non-engagement condition to allow the torque converter 12 to implement its primary functions. Under the non-engagement condition, the torque converter 12 converts a torque at an amplification rate corresponding to an input/output rotating speed ratio and then transmits the converted torque of the crank shaft 16 to the input shaft 20.

The automatic transmission 14 having the input shaft 20 and an output shaft 34 is constructed as a stepped planetary gear unit wherein one of a plurality of forward gear steps and a reverse gear step is selected to be under an engagement condition according to a specific combination of operating conditions of a plurality of hydraulic frictional engagement units. The automatic transmission 14 includes a hydraulic change gear control circuit 44 for regulating gear steps of the automatic transmission 14 and a hydraulic engagement control circuit 46 for controlling engagement of the lock-up clutch 32. The hydraulic change gear control circuit 44 has a first solenoid-operated valve 48 and a second solenoid-operated valve 50, which are respectively operated on and off by a solenoid 48a and a solenoid 50a. The clutch and brake mechanism is selectively operated according to a combination of the operating conditions of the first solenoid-operated valve 48 and the second solenoid-operated valve 50 so as to realize one of a first gear speed through a fourth gear speed.

The hydraulic engagement control circuit 46 includes a linear solenoid valve 52, a change-over valve 54, and a slip control valve 56. The linear solenoid valve 52 has a fixed modulator pressure Pmodu generated in the hydraulic change gear control circuit 44 as an initial pressure and acts linearly in response to the current running through a linear solenoid 52a. The linear solenoid valve 52 continuously generates an output pressure Plin having the magnitude corresponding to the intensity of a driving current Isol from an electronic control unit (ECU) 42. The output pressure Plin is applied to the change-over valve 54 and the slip control valve 56. The change-over valve 54 is movable between a release position at which the lock-up clutch 32 is released and an engagement position at which the lock-up clutch 32 is engaged. Initial operating pressure of the slip control valve 56 is a regulator pressure Pcl generated in response to a throttle valve travel by a clutch pressure control valve (not shown) in the hydraulic change gear control circuit 44.

The change-over valve 54 includes a spring 58 for pressing a spool valve element (not shown) towards the release position, a first port 60 receiving the regulator pressure Pcl, a second port 62 receiving an output pressure of the slip control valve 56, a third port 64 connecting with the release oil chamber 33, a fourth port 66 connecting with the engagement oil chamber 35, and a fifth port 68 connecting with a drain pipe. When the output pressure Plin of the linear solenoid valve 52 applied onto the spool valve element of the change-over valve 54 becomes lower than a predetermined level, the spool valve element of the change-over valve 54 is moved to the release position illustrated in FIG. 1 by the pressing force of the spring 58. The shift of the change-over valve 54 to the release position results in blocking the second port 62 and connecting the first port 60 to the third port 64 as well as the fourth port 66 to the fifth port 68. This makes an oil pressure Poff in the release oil chamber 33 equal to the regulator pressure Pcl and an oil pressure Pon in the engagement oil chamber 35 equal to the atmospheric pressure, thereby releasing the lock-up clutch 32. At this moment, the torque converter 12 implements its primary functions to convert and transmit the torque.

When the output pressure Plin of the linear solenoid valve 52 applied on the spool valve element of the change-over valve 54 becomes higher than the predetermined level, on the other hand, the spool valve element of the change-over valve 54 is moved to the engagement position against the pressing force of the spring 58. The shift of the change-over valve 54 to the engagement position results in blocking the fifth port 68 and connecting the first port 60 to the fourth port 66 as well as the second port 62 to the third port 64. This makes the oil pressure Pon in the engagement oil chamber 35 equal to the regulator pressure Pcl and controls the oil pressure Poff in the release oil chamber 35 by means of the slip control valve 56, thereby slip controlling or engaging the lock-up clutch 32.

The slip control valve 56 is provided with a spring 70 for pressing a spool valve element (not shown) towards an increase in the output pressure. The oil pressure Pon in the engagement oil chamber 35 is applied onto the spool valve element of the slip control valve 56 to generate a driving force towards an increase in the output pressure whereas the oil pressure Poff in the release oil chamber 33 and the output pressure Plin of the linear solenoid valve 52 are applied onto the spool valve element of the slip control valve 56 to generate a driving force towards a decrease in the output pressure. The slip control valve 56 accordingly works to vary a pressure difference $\Delta P = Pon - Poff$ representing a slip amount, in response to the output pressure Plin of the linear solenoid valve 52 as expressed by:

$$\Delta P = Pon - Poff \qquad (1)$$
$$= (A3 - A1)Plin - F/A1$$

where F, A1, A2(=A1), and A3 respectively denote a pressing force of the spring 70, an area in the spool valve element which the oil pressure Pon is applied to, an area which the oil pressure Poff is applied to, an area which the output pressure Plin is applied to.

Figure 2:
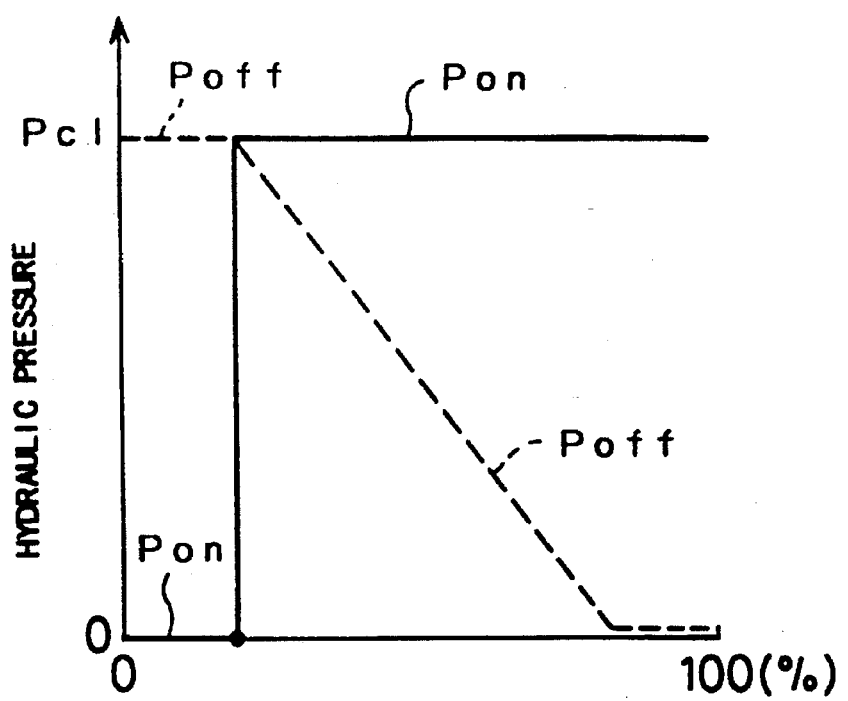
FIG. 2 is a graph showing the relationship between the driving current of a linear solenoid valve 52 and the oil pressure Pcl.

In the hydraulic engagement control circuit 46 constructed as above, both the oil pressure Pon in the engagement oil chamber 35 and the oil pressure Poff in the release oil chamber 33 vary with the output pressure Plin of the linear solenoid valve 52 as shown in the graph of FIG. 2.

This means that the switching operation of the change-over valve 54 and the slip control of the lock-up clutch 32 after a shift of the change-over valve 54 to the engagement position are conducted in response to the output pressure Plin of the linear solenoid valve 52.

The electronic control unit 42 designed and constructed as below executes the processing required for the slip control. The electronic control unit 42 is constructed as a microcomputer consisting of a variety of known elements including a CPU 82, a ROM 84, a RAM 86, and an interface circuit (not shown). In this embodiment, the interface circuit 85 of the electronic control unit 42 connects with a throttle sensor 88 for detecting a travel of a throttle valve disposed in an intake manifold of the engine 10, an engine speed sensor 90 for detecting the rotating speed of the engine 10, an input shaft speed sensor 92 for detecting the rotating speed of the input shaft 20 of the automatic transmission 14, an output shaft speed sensor 94 for detecting the rotating speed of the output shaft 34 of the automatic transmission 14, and a lever position sensor 98 for detecting the position of a gear shift lever 96, L (low), S (second), D (drive), N (neutral), R (reverse), and P (parking) ranges. The electronic control unit 42 receives data of a throttle valve travel θth, an engine speed Ne (rotating speed NP of the pump impeller 18), a rotating speed Nin of the input shaft 20, a rotating speed Nout of the output shaft 34, and a position Ps of the gear shift lever 96 output from the corresponding sensors 88, 90, 92, 94, and 98 via the interface circuit 85.

The CPU 82 of the electronic control unit 42 uses the RAM 86 as a work area, processes input signals according to a program previously stored in the ROM 84, and controls the first solenoid-operated valve 48, the second solenoid-operated valve 50, and the linear solenoid valve 52 to execute the change gear control of the automatic transmission 14 and the engagement and release of the lock-up clutch 32. Concrete process of the change gear control includes steps of selecting a change gear map corresponding to an actual change gear step out of a plurality of change gear maps previously stored in the ROM 84, referring to the selected change gear map to determine a change gear step based on a driving condition of the vehicle, for example, a vehicle speed SPD calculated from the throttle valve travel θth and the output shaft rotating speed Nout, and actuating the first solenoid-operated valve 48 and the second solenoid-operated valve 50 to realize the change gear step. The CPU 82 accordingly controls the clutch and braking mechanism of the automatic transmission 14 and selects one of the four forward gear steps to realize a desirable gear change.

Figure 3:
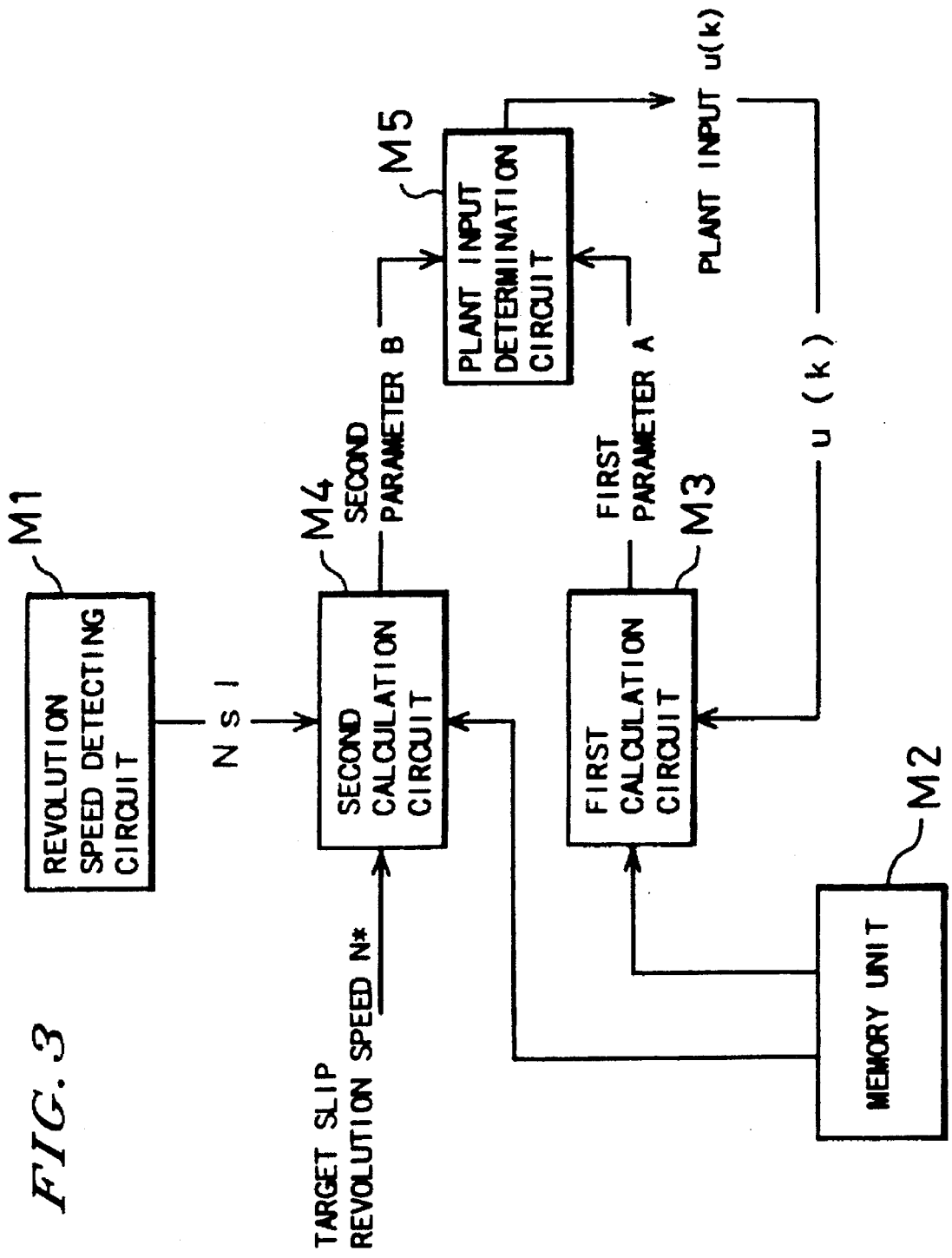
FIG. 3 is a block diagram showing a fundamental structure of the clutch slip control device of the first embodiment.

Concrete process of the slip control executed in the electronic control unit 42 is described below. FIG. 3 is a block diagram showing a fundamental structure of the clutch slip control device of the embodiment. As illustrated in FIG. 3, the clutch slip control device includes a slip revolution speed detecting circuit M1, a memory unit M2, a first calculation circuit M3, a second calculation circuit M4, and a plant input determination circuit M5. The memory unit M2 stores constants previously set to fulfill the response and stability of the slip feedback control system. These constants are determined by a high-order function, which approximates variations in the input-output frequency characteristics of a plant input u(k) and an actual slip revolution speed Nsl. The first calculation circuit M3 repeatedly determines a first parameter A using the constants. The first parameter A discretely reflects the past plant inputs u(k−i) (i=1, 2, ..., n), wherein u(k−1) represents a previous plant input obtained in a previous cycle and u(k−n) denotes an plant input obtained in a cycle executed n times before. The slip revolution speed detecting circuit M1 detects the actual slip revolution speed Nsl of a clutch CL. The second calculation circuit M4 repeatedly determines a second parameter B using the constants stored in the memory unit M2. The second parameter B discretely reflects the past deviations e(k−i) (i=0, ..., m) of the actual slip revolution speeds Nsl from a target slip revolution speed N*, wherein e(k) represents a current deviation obtained in a current cycle and e(k−m) denotes a deviation obtained in a cycle executed m times before. The plant input determination circuit M5 determines a next plant input u(k) based on the first and the second parameters A and B thus determined. The clutch slip control device utilizes the plant input u(k) to make the actual slip revolution speed Nsl coincident with the target slip revolution speed N*.

Figure 4:
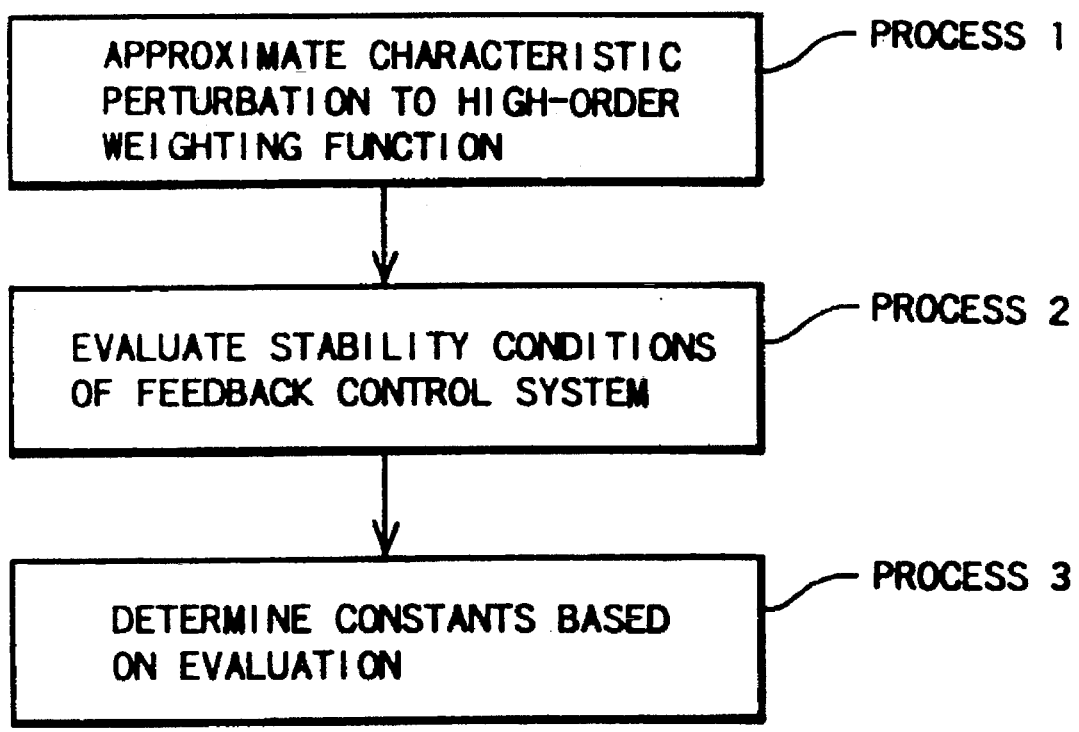
FIG. 4 shows a main process of designing the clutch slip control device of the first embodiment.

Design of the clutch slip control device of the embodiment is described here briefly whereas detailed design technique will be described later. At process S1 in FIG. 4, characteristic perturbations of a slip conditions-adjusting system are measured by a plurality of factors causing the characteristic perturbations, and a total of the characteristic perturbations by the plurality of factors is approximated by a high-order first weighting function W2. At process S2, a first value and a second value are evaluated as conditions for satisfying the response and stability of a feedback control system of the slip conditions over the characteristic perturbations. The first value is determined by taking account of the first weighting function W2 and a transfer function from the target slip revolution speed to the actual slip revolution speed while the second value is determined by taking account of a transfer function from the target slip revolution speed to a deviation and a second weighting function W1 set for guaranteeing the response of the feedback control system. At process S3, constants used for calculating a control quantity of the feedback control system are determined on the basis of the evaluation.

Figure 5:
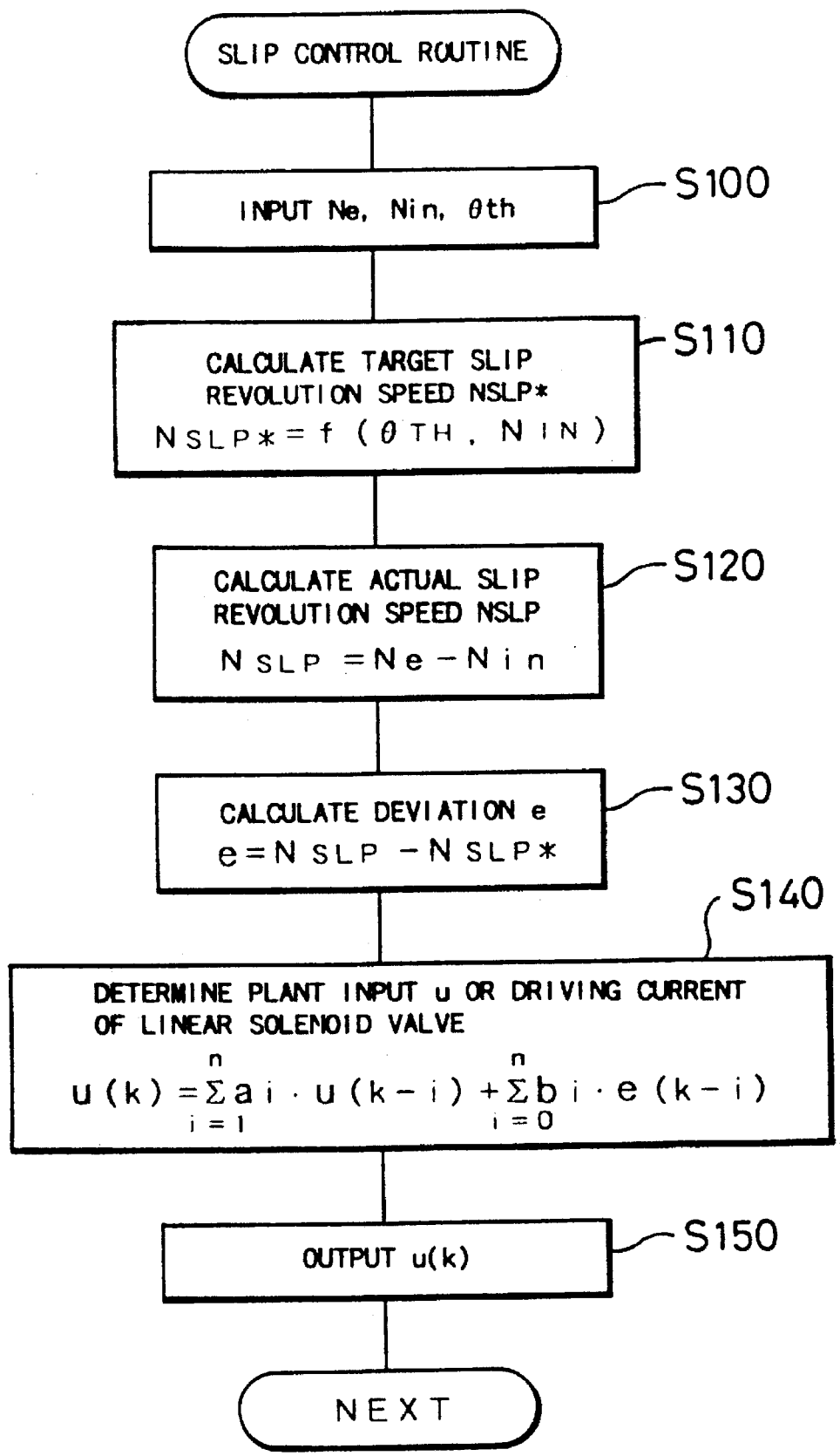
FIG. 5 is a flowchart showing a slip control process routine in the first embodiment.
Figure 6:
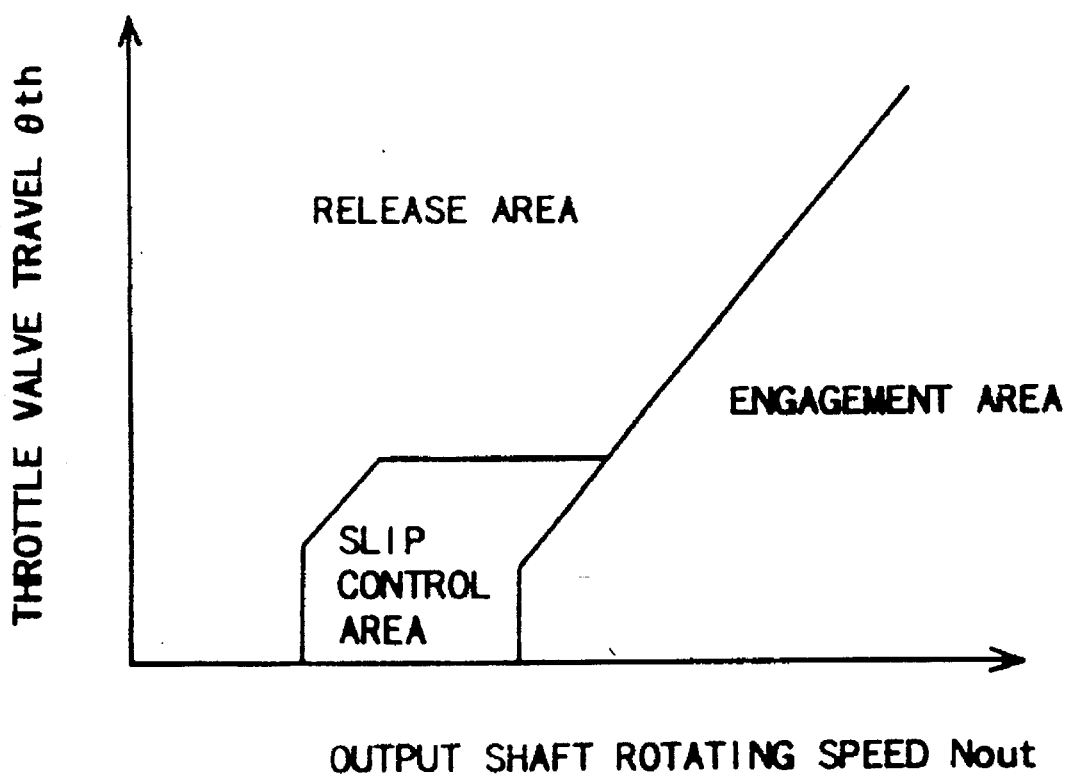
FIG. 6 is a graph showing a slip control area specified from an output shaft rotating speed Nout and a throttle valve travel θth in the first embodiment.

The processing actually executed in the electronic control unit 42 to realize the slip control device of the embodiment thus designed is described with the flowchart of FIG. 5. The flowchart shows a slip control routine executed by the electronic control unit 42. The electronic control unit 42 specifies a slip control area based on the driving conditions of the vehicle and repeatedly executes the slip control routine at intervals of several milliseconds. In a concrete operation, the electronic control unit 42 determines whether the slip control routine is to be executed, based on the output shaft rotating speed Nout and the throttle valve travel θth. FIG. 6 shows an example of such conditions.

When both the output shaft rotating speed Nout and the throttle valve travel θth are in the slip control area, the electronic control unit 42 starts the slip control routine of FIG. 5. At step S100, the engine speed Ne, the input shaft rotating speed Nin, and the throttle valve travel θth are input via the interface circuit 85. At step S110, the electronic control unit 42 determines a target slip revolution speed NSLP* based on the input shaft rotating speed Nin and the throttle valve travel θth input at step S100. The target slip revolution speed NSLP* may be determined by referring to a three-dimensional map previously stored to represent the relationship between the input shaft rotating speed Nin, the throttle valve travel θth, and the target slip revolution speed NSLP*.

Figure 7:
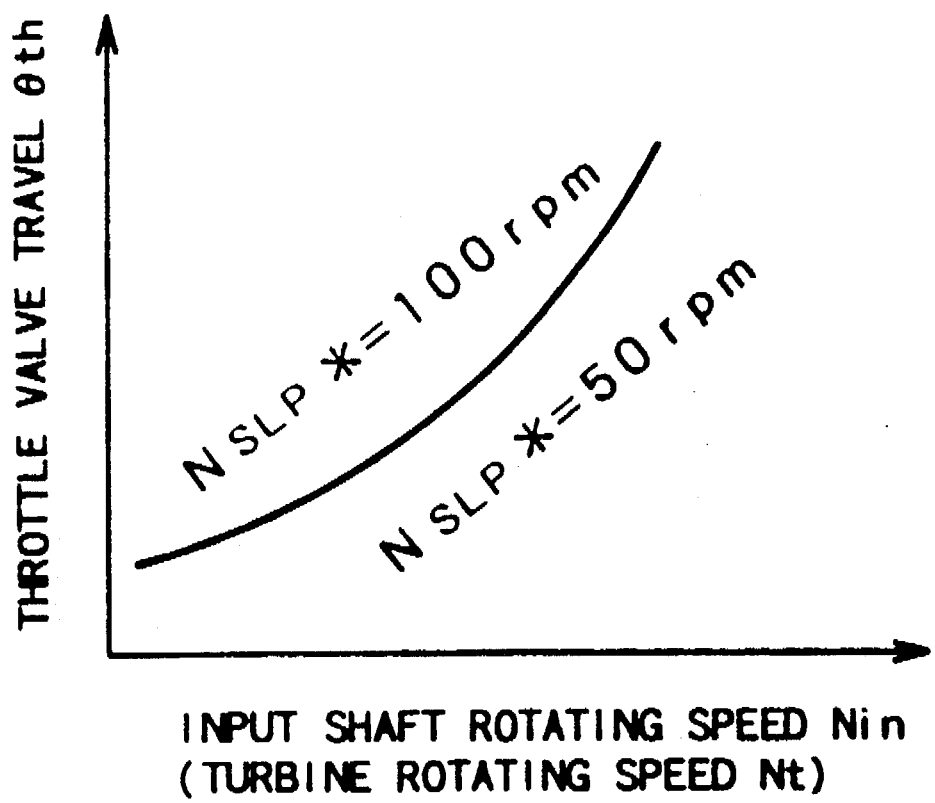
FIG. 7 is a graph for determining a target slip revolution speed NSLP* in the slip control area.

FIG. 7 is an example of such maps used for determining the target slip revolution speed NSLP* on the basis of the input shaft rotating speed Nin and the throttle valve travel θth. In this example, the target slip revolution speed NSLP* is either 50 rpm or 100 rpm according to the input shaft rotating speed Nin and the throttle valve travel θth. After the target slip revolution speed NSLP* is determined at step S110, the program proceeds to step S120 at which an actual slip revolution speed NSLP of the torque converter 12 is calculated as a difference between the engine speed Ne and the input shaft rotating speed Nin. At step S130, a deviation e is determined by subtracting the target slip revolution speed NSLP* from the actual slip revolution speed NSLP.

Although the times of repetition of the slip control routine are not mentioned above, the routine repeated at intervals ts of several milliseconds is a discrete process to make the times of repetition distinguishable. The electronic control unit 42 stores in the RAM 86 the values of the deviation e and a plant input u corresponding to a driving current actually running through the linear solenoid valve 52, which are obtained by execution of the current cycle through the cycle executed i times before, that is, time series at sampling time ts. At step S140, the electronic control unit 42 calculates the plant input u corresponding to the driving current of the linear solenoid valve 52 by the following equation:

$$u(k) = \sum_{i=1}^{n} ai \cdot u(k-i) + \sum_{i=0}^{n} bi \cdot e(k-i) \qquad (2)$$

As expressed by Equation 2, a next plant input u(k) is determined as a total of summation of past plant inputs u(k–i), which were obtained in the previous cycle through in the cycle executed n times before, multiplied by a first controller coefficient ai and summation of past deviations e(k–i), which were obtained in the current cycle through in the cycle executed n times before, multiplied by a second controller coefficient bi. Determination of the first controller coefficient ai and the second controller coefficient bi will be described later. At step S150, the electronic control unit 42 outputs the next plant input u(k) thus determined at step S150 to the linear solenoid valve 52 via the interface circuit 85. The program then goes to NEXT and exits from the routine. After every cycle of the routine shown in FIG. 5, the 'i' time series data of the past plant inputs u(k–i) and the deviations e(k–i) stored in the RAM 86 are updated respectively.

The processing described above is designed according to the H∞ control theory. An optimal regulator attaches much importance to a specific trade-off between the magnitude of operation and performance of the transient response and does not directly correspond to various trade-offs generated in a real control system including a trade-off between the response and the stability of control and that between the response and the noise resistance. The H∞ control is a technique developed to overcome the limitation problem. The H∞ control introduces frequency-domain loop-shaping into design of the control system to allow concrete design utilizing the maximum gain of the frequency response, that is, H∞ norm, as an evaluation function. The standard H∞ control problem is also called the mixed sensitivity problem and the control system of the embodiment is designed on the basis of such ideas.

Figure 8:
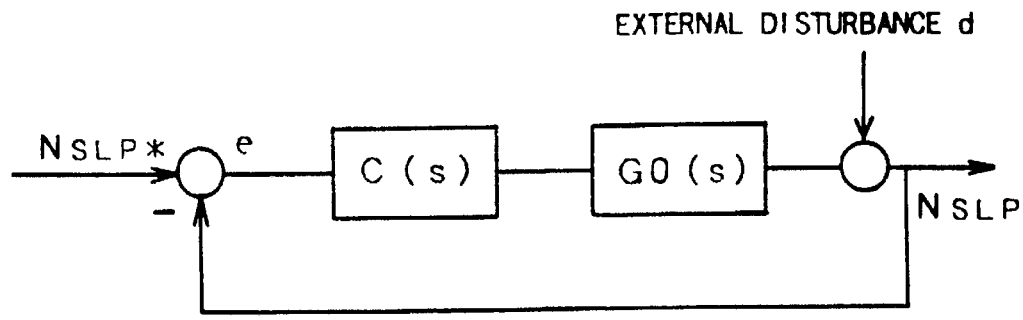
FIG. 8 is a block diagram showing a control system before a characteristic perturbation with a transfer function.
Figure 9:
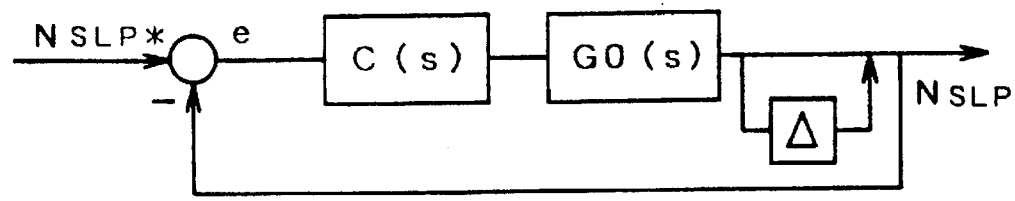
FIG. 9 is a block diagram showing the control system after the characteristic perturbation with a transfer function.

Specific design for determining the first controller coefficient ai and the second controller coefficient bi used at step S140 in the flowchart of FIG. 5 is described in detail. Design framework in a single input-output system is described prior to the concrete design process. A closed loop system shown in FIG. 8 is assumed here as a slip revolution speed control system. In the following description, NSLP*, e, C(s), G0(s) respectively denote a target slip revolution speed, a deviation of an actual slip revolution speed NSLP from the target slip revolution speed NSLP*, a transfer function of the control system (hereinafter may be referred to as the controller), and a transfer function of a plant (object to be controlled). Assume that a characteristic perturbation Δ(s) occurs in the control system as shown in FIG. 9. The characteristic perturbation is ascribed to various factors such as deterioration of a frictional member as shown in FIGS. 37, 38A, 38B, and 39. A plant transfer function G(s) after the characteristic perturbation is expressed as a multiplicative perturbation from the initial designed characteristics, which is given by:

$$G(s)=\{I+\Delta(s)\}G0(s) \qquad (3)$$

wherein I represents a unit matrix.

Stability under the condition of generating the characteristic perturbation Δ(s) is expressed by the Small Gain theorem based on Generalized Nyquist Stability Theorem. The Small Gain theorem gives a condition for stabilizing the whole closed loop system when the controller transfer function C(s) and the plant transfer function G0(s) are respectively stable. When a transfer function of the closed loop system is expressed as L (s)=G0(s)C(s), the condition is given by:

$$\|L(s)\|_\infty = \max_\omega |L(j\omega)| < 1 \qquad (4)$$

Figure 10:
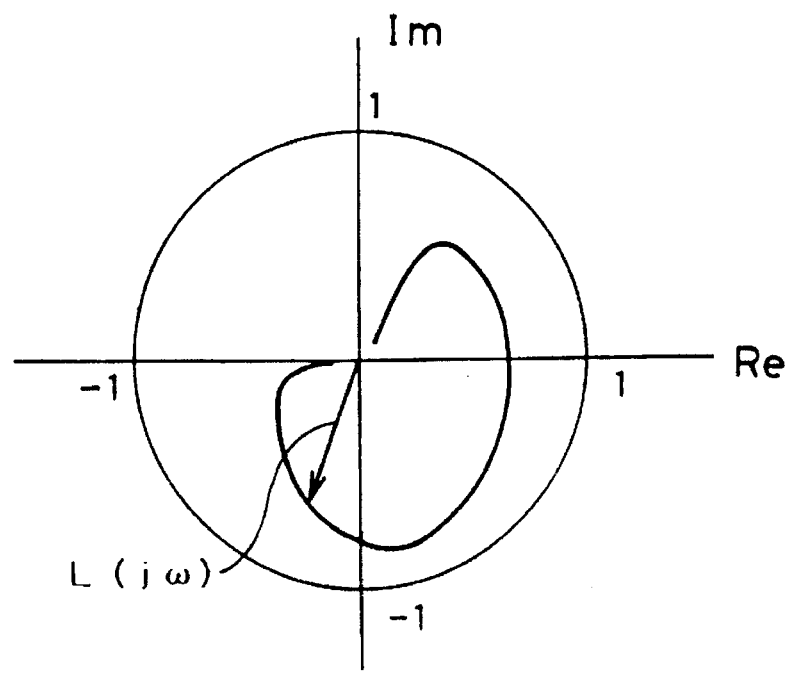
FIG. 10 is a Nyquist plot in the control system.
Figure 11:
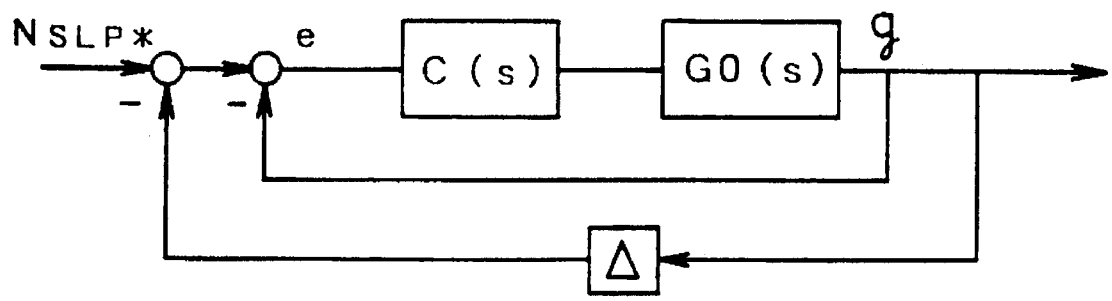
FIG. 11 is a block diagram showing a model system equivalently converted from the control system of FIG. 9.

Inequality 4 defines the H∞ norm in the single input-output system and gives the maximum gain of the loop transfer function L(s). FIG. 10 shows an exemplified Nyquist plot. As long as the locus of a vector L(jω) is within a unit circle, the closed loop system is stable. Under the condition of generating the characteristic perturbation Δ(s), the system shown in FIG. 9 can be converted equivalently to a system shown in FIG. 11. Based on the Small Gain theorem, the condition for stabilizing the system is to satisfy the following inequality:

$$\|\Delta(s)(I+G0\ C)^{-1}G0\ C\|_\infty < 1 \qquad (5)$$

wherein I denotes a unit matrix.

Figure 12:
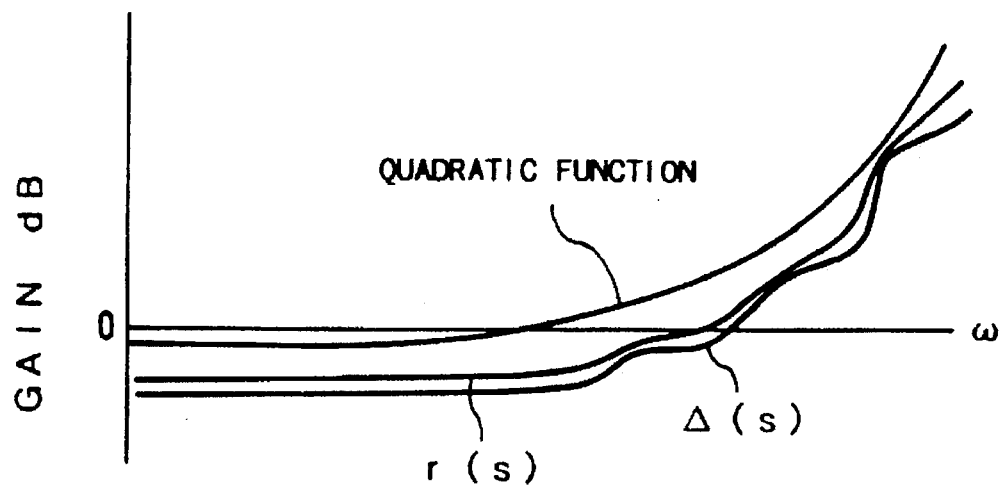
FIG. 12 is a graph illustrating a characteristic perturbation with the class r(s) in a frequency domain.

Characteristic perturbations are generally ascribed to various factors. The characteristic perturbation of the whole closed system gives a complicated curve in the frequency domain as illustrated in FIG. 12. In the graph of FIG. 12, Δ(s) shows summation of characteristic perturbations by a plurality of factors or classes. The characteristic perturbation on the control procedure is approximated by a high-order function substantially representing the actual characteristic perturbation Δ(s). In this embodiment, an eighth-order function r(s) is used. Upon condition that the eighth-order function r (s) always exceeds the actual characteristic perturbation Δ(s) in approximation, that is, as long as the following inequality is satisfied:

$$\|r^{-1}(s)\cdot\Delta(s)\|_\infty < 1 \qquad (6)$$

the absolute value |r(s)| gives a width of the characteristic perturbation allowable in the control system. Inequality 7c is given by rewriting Inequality 6 into Inequality 7a and using the relationship of Inequality 7b. In the following equations or inequalities, (s) may be omitted for the clarity of expression. For example, G(s) may be shown as G.

$$|r^{-1}(j\omega)\cdot\Delta(j\omega)| \le 1 \text{ for } \forall_\omega \qquad (7a)$$
$$\therefore \|r^{-1}\cdot\Delta\|_\infty \le 1$$
$$\|A\cdot B\|_\infty \le \|A\|_\infty \cdot \|B\|_\infty \qquad (7b)$$
$$\|\Delta\ (I+G0C)^{-1}G0C\|_\infty = \|\Delta r^{-1}r\ (I+G0C)^{-1}G0C\|_\infty \le$$
$$\|r^{-1}\Delta\|_\infty \cdot \|r\ (I+G0C)^{-1}G0C\|_\infty \le \|r\ (I+G0C)^{-1}G0C\|_\infty$$

When the right side of Inequality 7c is not greater than 1, that is, when Inequality 8 is satisfied, the condition of Inequality 5 is fulfilled and the loop system after the characteristic perturbation shown in FIG. 9 becomes stable against any characteristic perturbation satisfying Inequality 6.

$$\|r(I+G0C)^{-1}G0C\|_\infty < 1 \qquad (8)$$

With the closed loop transfer: function L(s)=G0(s)C(s), conditional Inequality 8 is rewritten as:

$$\|r(I+L)^{-1}L\|_\infty < 1$$

When T=(1+L)−1L, it is further rewritten as:

$$\|rT\|_\infty < 1 \qquad (9)$$

wherein T is known as the complementary sensitivity function which represents a transfer function from a target slip speed to an actual slip speed. When the class r(s) approximating the characteristic perturbation increases in a specific frequency band to decrease the stability, the small complementary sensitivity function in the greatly perturbed frequency band desirably maintains the stability of the control system.

The response against the characteristic perturbation can be enhanced under the substantially fixed stability condition as described below. In the system of FIG. 8, the response characteristics in the control system are expressed by the follow-up speed of the deviation e with respect to a variation in the target slip revolution speed NSLP* and shown as transfer characteristics from the target slip revolution speed NSLP* to the deviation e. The stability margin against an external disturbance d directly affecting the slip speed is shown as transfer characteristics from the external disturbance d to a plant output y (the actual slip revolution speed NSLP in this embodiment). These two characteristics are given by the following equation and generally known as the sensitivity function S:

$$S(s)=\{I+L(s)\}^{-1} \qquad (10)$$

The smaller sensitivity function S attenuates the variation in the deviation e from the target value and in the plant output y against the external disturbance d and enhances the response characteristics of the control system. The smaller complementary sensitivity function T and sensitivity function S is accordingly desirable to realize stable and desirable response characteristics against the characteristic perturbation of the control system. The complementary sensitivity function T and the sensitivity function S satisfies the following relationship:

$$S(s)+T(s)=\{I+L(s)\}^{-1}+L(s)\{I+L(s)\}^{-1} \qquad (11)$$

This means that reduction of either the complementary sensitivity function T or the sensitivity function S results in increase in the other function. As generally known, the small sensitivity function S is desirable in a low frequency domain whereas the small complementary sensitivity function T is desirable in a high frequency domain. This means that over-evaluation of the stability condition against the characteristic perturbation, that is, excessive reduction of the complementary sensitivity function T(s) in a lower frequency domain, prevents the sensitivity function S(s) defining the response from being made small in the high frequency domain. Insufficient evaluation of the stability condition against the characteristic perturbation, on the other hand, allows the sensitivity function S(s) to fall in the high frequency domain so as to enhance the response in design, but undesirably decreases the stability over the characteristic perturbation.

Figure 13:
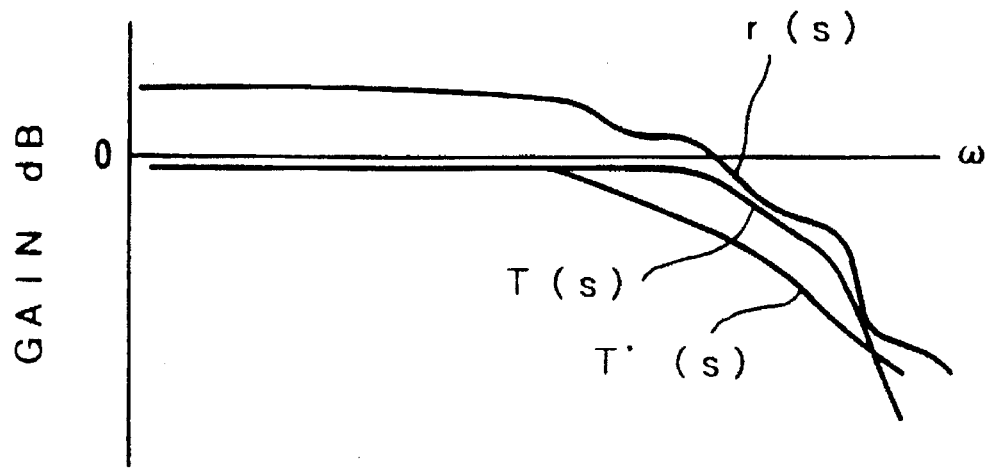
FIG. 13 is a graph illustrating a complementary sensitivity function T(s) plotted against the frequency domain.

It is accordingly required to approximate the characteristic perturbation by a high-order function as shown in FIG. 12, thereby decreasing the complementary sensitivity function T(s) only in a required frequency domain as well as making the sensitivity function S(s) small in a range of satisfying the complementary condition shown by Equation 11. In the graph of FIG. 12, r(s) is also approximated by a conventional quadratic function. The approximation by the quadratic function rises in a low frequency domain in order to cover the characteristic perturbation A(s) in a higher frequency domain, and thus significantly affects the complementary sensitivity function T(s) as shown in FIG. 13 compared with the approximation by a higher-order function (eighth-order function in the embodiment). In the graph of FIG. 13, T(s) and T'(s) respectively represent approximation of r(s) by a high-order function and that by a quadratic function. The complementary sensitivity function T(s) in approximation by a high-order function falls in a higher frequency domain than the complementary sensitivity function T'(s) in approximation by a quadratic function. This allows the sensitivity function S(s) to fall in the higher frequency domain by a difference between T(s) and T'(s). The approximation by a high-order function accordingly improves the response.

Conventional PID control has gentle frequency characteristics and is equivalent to approximation of the characteristic perturbation by a low-order function as shown in FIG. 12. In the PID control, the sensitivity function S(s) can thus not be lowered in the high frequency domain because of the complementary condition of Equation 11. This results in substantially no enhancing the control response and thereby no attaining the desirable slip control.

The slip control device of the embodiment takes the approach of enhancing the response while maintaining the stability over the characteristic perturbation under the complementary condition of the complementary sensitivity function T(s) and the sensitivity function S(s) shown in Equation 11. A controller having high-order frequency characteristics of the above approach is designed based on time series data including at least the plant input and the deviation, thereby realizing the desirable slip control.

Based on the general conditions described above, the controller C(s) is designed in the following manner according to the characteristics of the lock-up clutch 32 of the torque converter 12, which is a plant in the embodiment.

Figure 14:
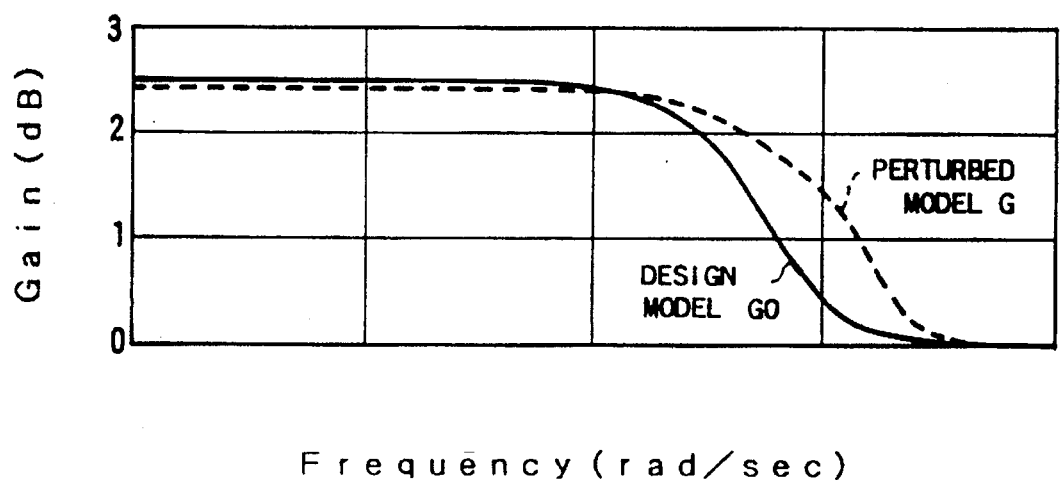
FIG. 14 is a graph showing the gain characteristics of the lock-up clutch 32 plotted against the frequency domain.
Figure 15:
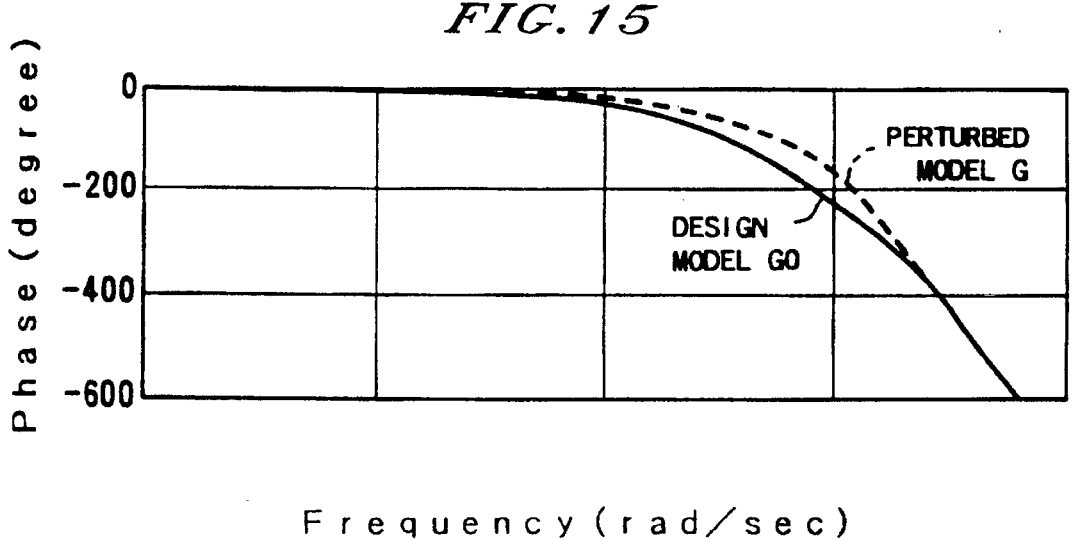
FIG. 15 is a graph showing the phase characteristics of the lock-up clutch 32 plotted against the frequency domain.
Figure 16:
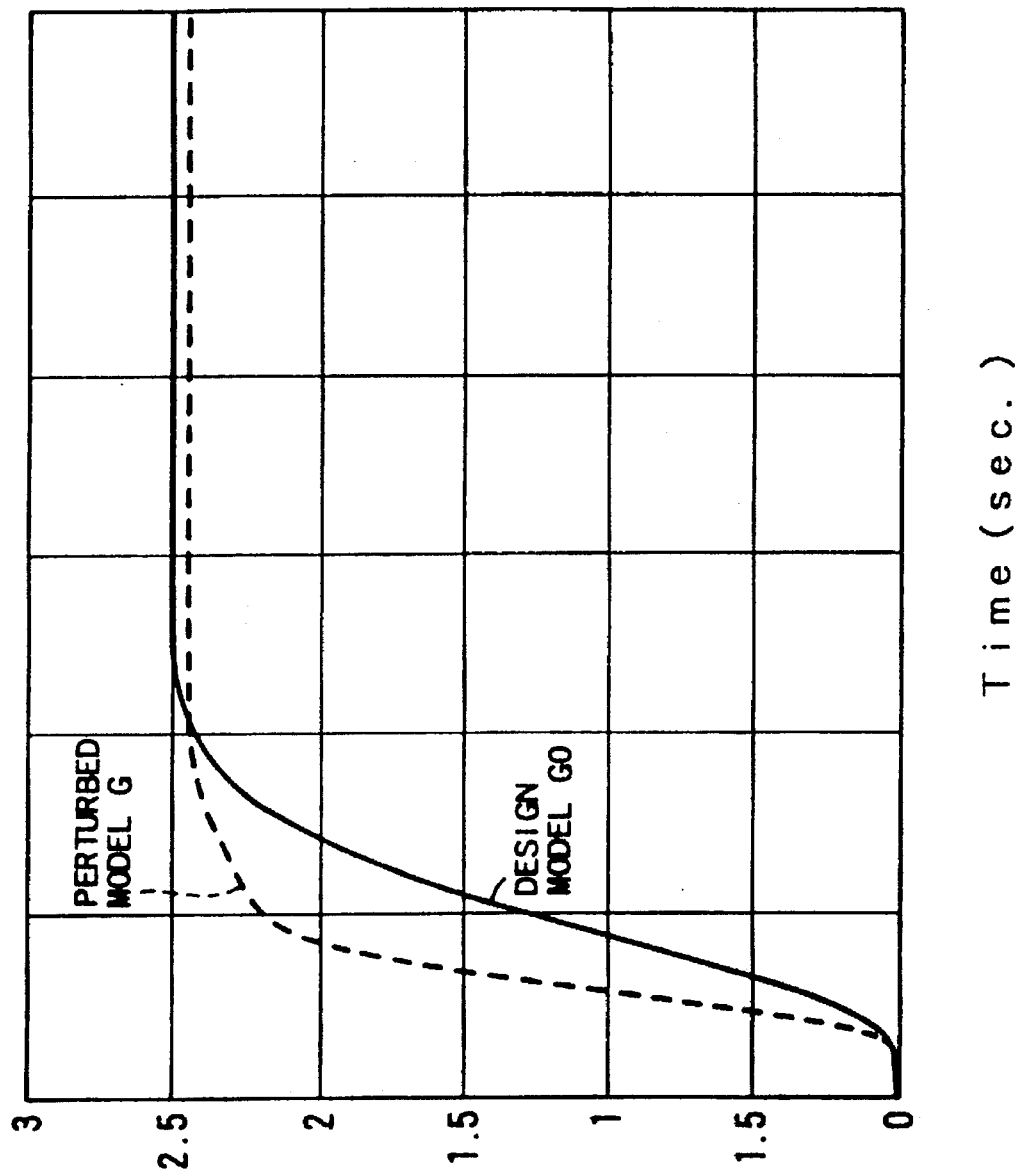
FIG. 16 is a graph showing an example of the control procedures of the lock-up clutch 32 using a design model G0 and a perturbed model G.

FIGS. 14 and 15 show the characteristics of the plant as an example. FIG. 14 are Bode plots of gain-frequency characteristics from the plant input of the lock-up clutch 32 or the solenoid current to the slip revolution speed NSLP at the vehicle speed of 45 km/h. FIG. 15 are also Bode plots of the phase-frequency characteristics. The lock-up clutch 32 is operated at a fixed vehicle speed under a load increasing condition. In FIGS. 14 and 15, the broken line represents a characteristic perturbation of the plant of the embodiment whereas the solid line represents design model characteristics. Both the gain and the phase of the plant are significantly varied from those of the design model. FIG. 16 shows the response against a stepped variation in the instruction value along a time axis under the condition that no feedback control is applied to the plant. The graph of FIG. 16 shows a sharp rise against the load variation when the characteristic variations shown in FIGS. 14 and 15 occur.

Figure 37:
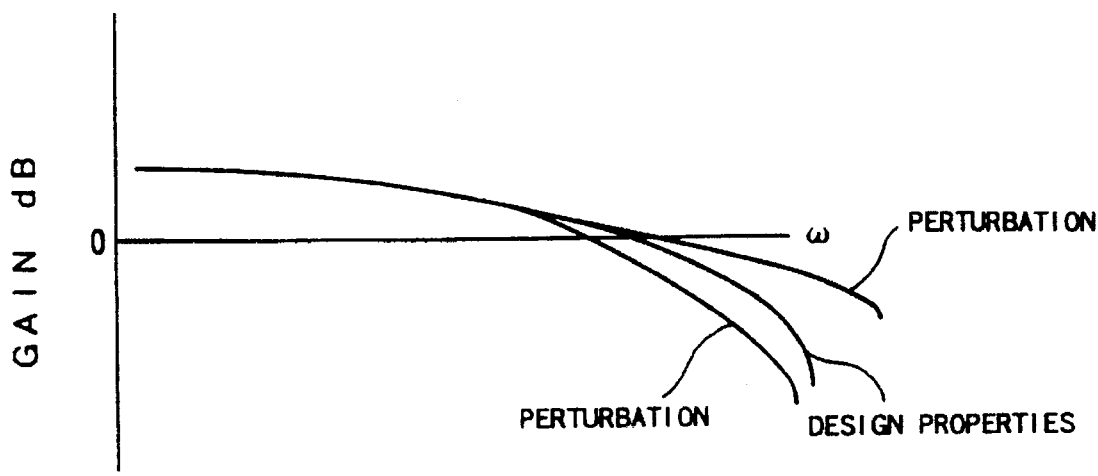
FIG. 37 is a graph showing characteristic perturbations of the slip control system of the lock-up clutch.
Figure 38B:
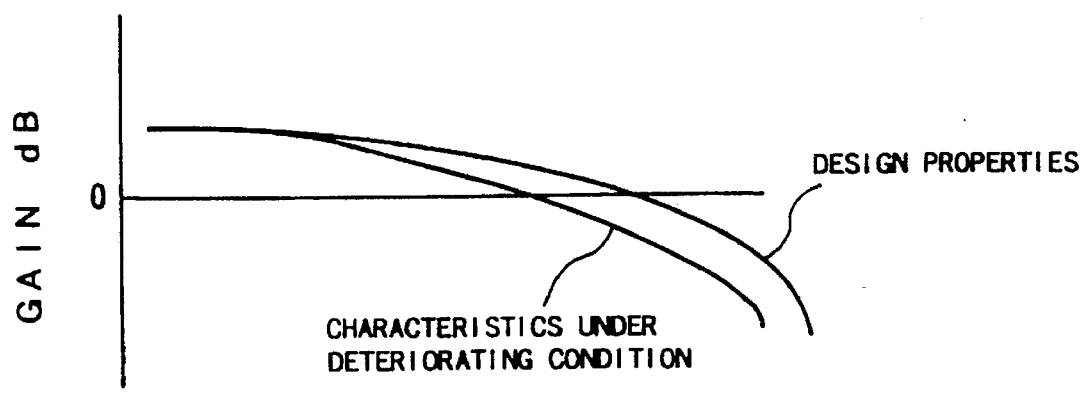
FIGS. 38A and 38B are graphs showing characteristic perturbations under the deteriorating condition.
Figure 38A:
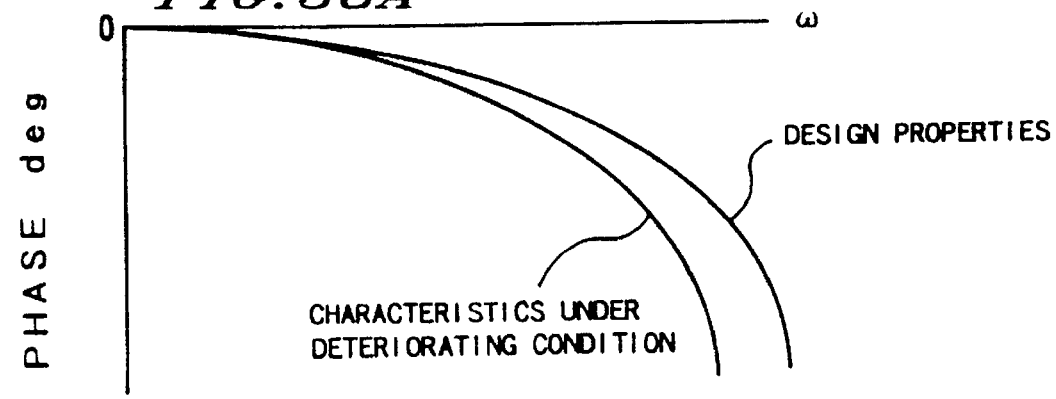
Figure 39:
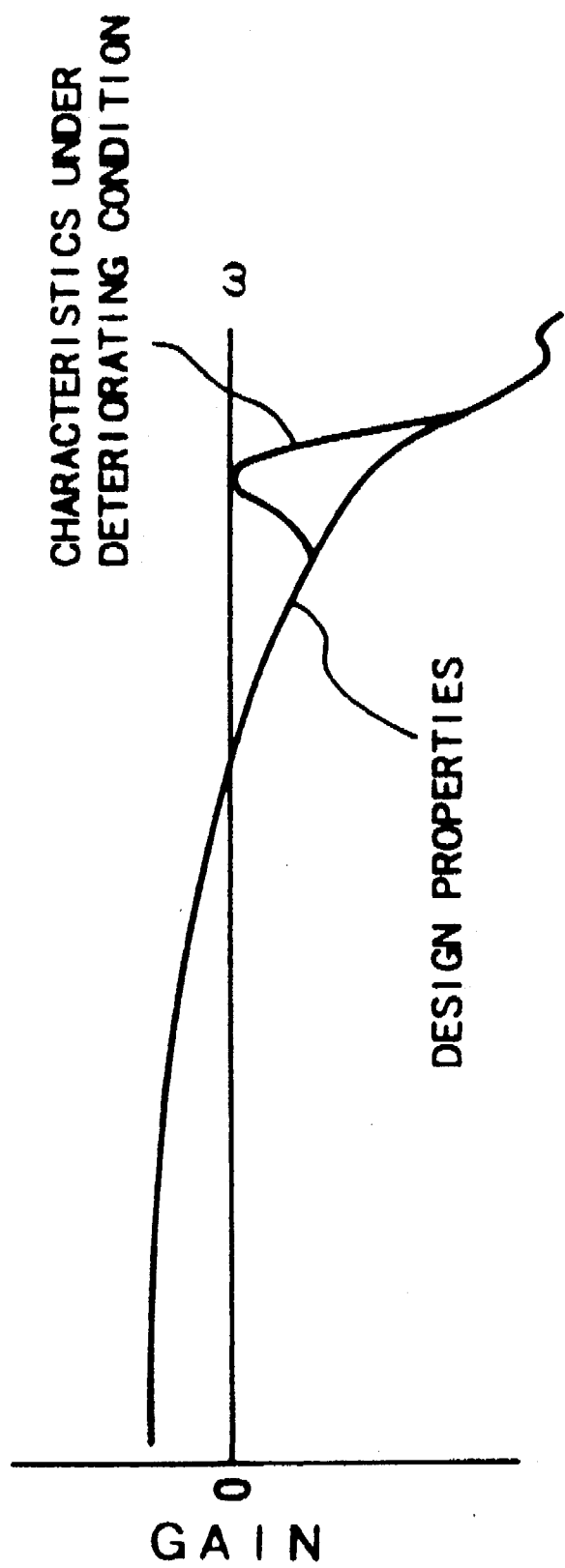
FIG. 39 is a graph showing another example characteristic perturbations under the deteriorating condition.

In the control system of the embodiment, large characteristic perturbations are expected in a high frequency domain as shown in FIGS. 37 through 39 and the characteristic perturbation class r(s) is expressed as a high-order function as shown in FIG. 12.

In the embodiment, the characteristic variation is approximated by an eighth-order function, and an evaluation function of Inequality 12 given below is applied to decrease the complementary sensitivity function T in a high frequency domain having a large characteristic variation and lower the sensitivity function S in a range of satisfying the complementary condition shown by Equation 11. In the description below, the characteristic perturbation class r(s) related to the sensitivity function S and the complementary sensitivity function T is expressed as weighting functions W1 and W2. By using the weighting function W2(s), the restriction condition of the complementary sensitivity function T for defining the stability over the characteristic perturbation is given by:

$$\|W2(s)\ T(s)\|_\infty < 1$$

By using the weighting function W1 (s), the restriction condition of the sensitivity function S representing the response is expressed as:

$$\|W1(s)\ S(s)\|_\infty < 1$$

Figure 18:
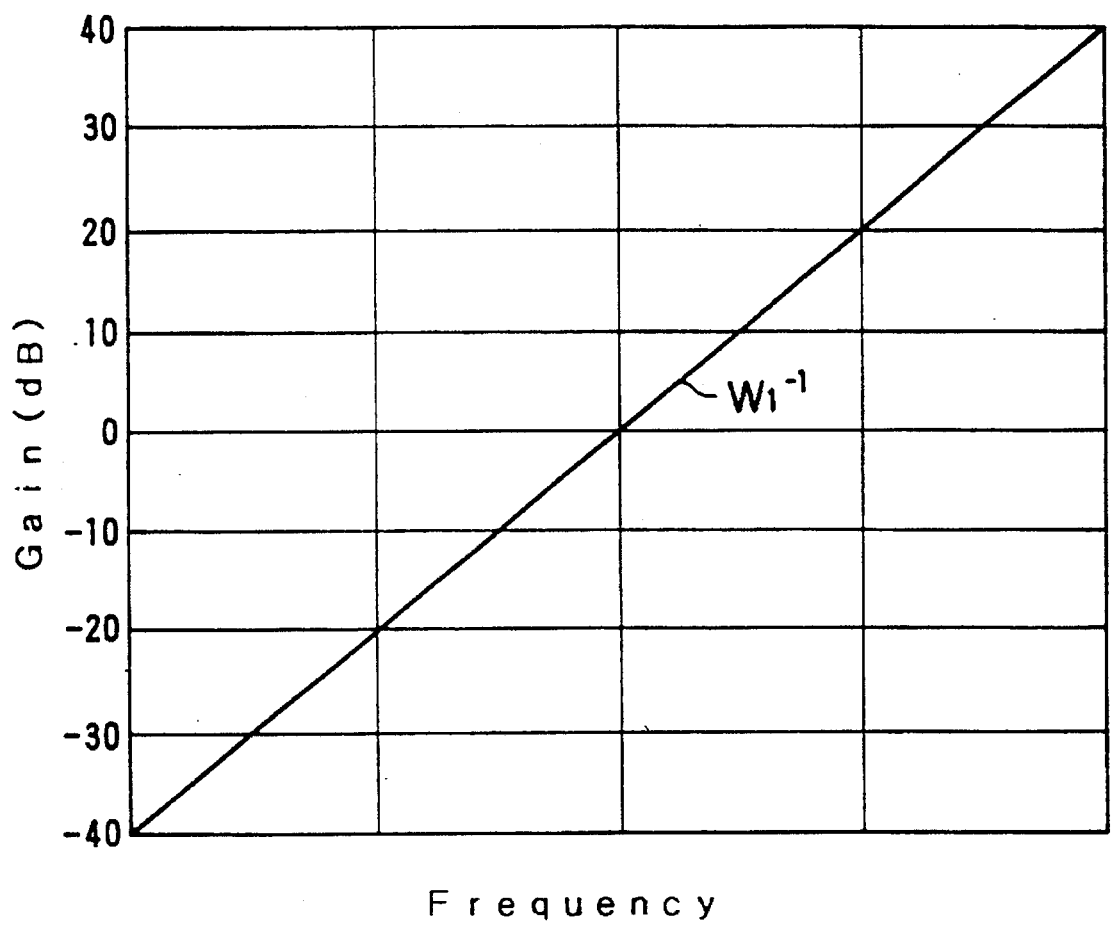
FIG. 18 is a graph showing an exemplified setting of the weighting function W1.
Figure 19:
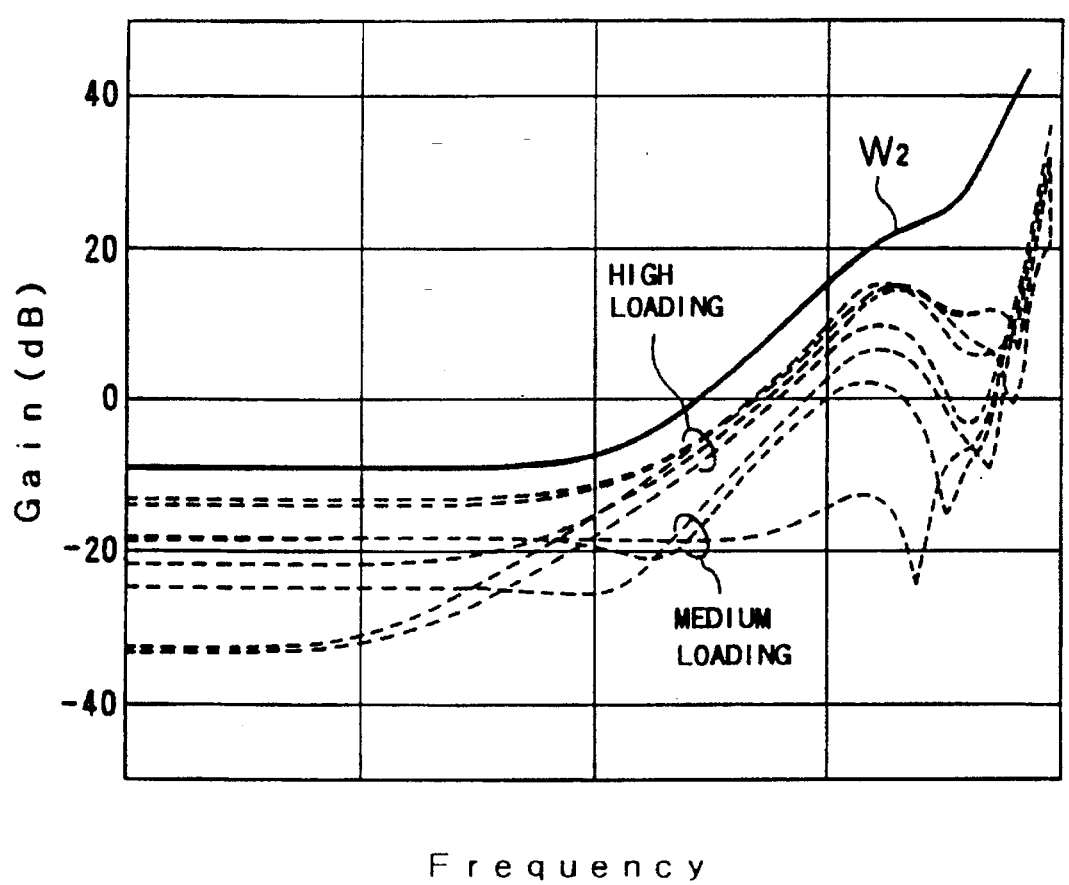
FIG. 19 is a graph showing various characteristic perturbations of the control system by the difference in load and the weighting function W2 set based on the characteristic perturbations.

Exemplified designs of the weighting functions W1 and W2 are shown in FIGS. 18 and 19. The weighting functions W1 and W2 are complementary to each other as clearly seen in FIG. 18. Since the norm satisfies Inequality 12a given below, the above restriction conditions are fulfilled by Inequality 12b also given below.

$$\max\{\|x\|_\infty, \|Y\|_\infty\} < \left\|\begin{matrix} X \\ Y \end{matrix}\right\|_\infty \tag{12a}$$

$$\left\|\begin{matrix} W1(s)S(s) \\ W1(s)T(s) \end{matrix}\right\|_\infty < 1 \tag{12b}$$

The controller C(s) satisfying the requirements of the control performance and robust can be designed by applying Equation 13 given below to a transfer function from exogenous inputs w to a controlled variable z under the feedback control condition.

$$Tzw = \left[\begin{matrix} W1(s)S(s) \\ W2(s)T(s) \end{matrix}\right] \tag{13}$$

Figure 17:
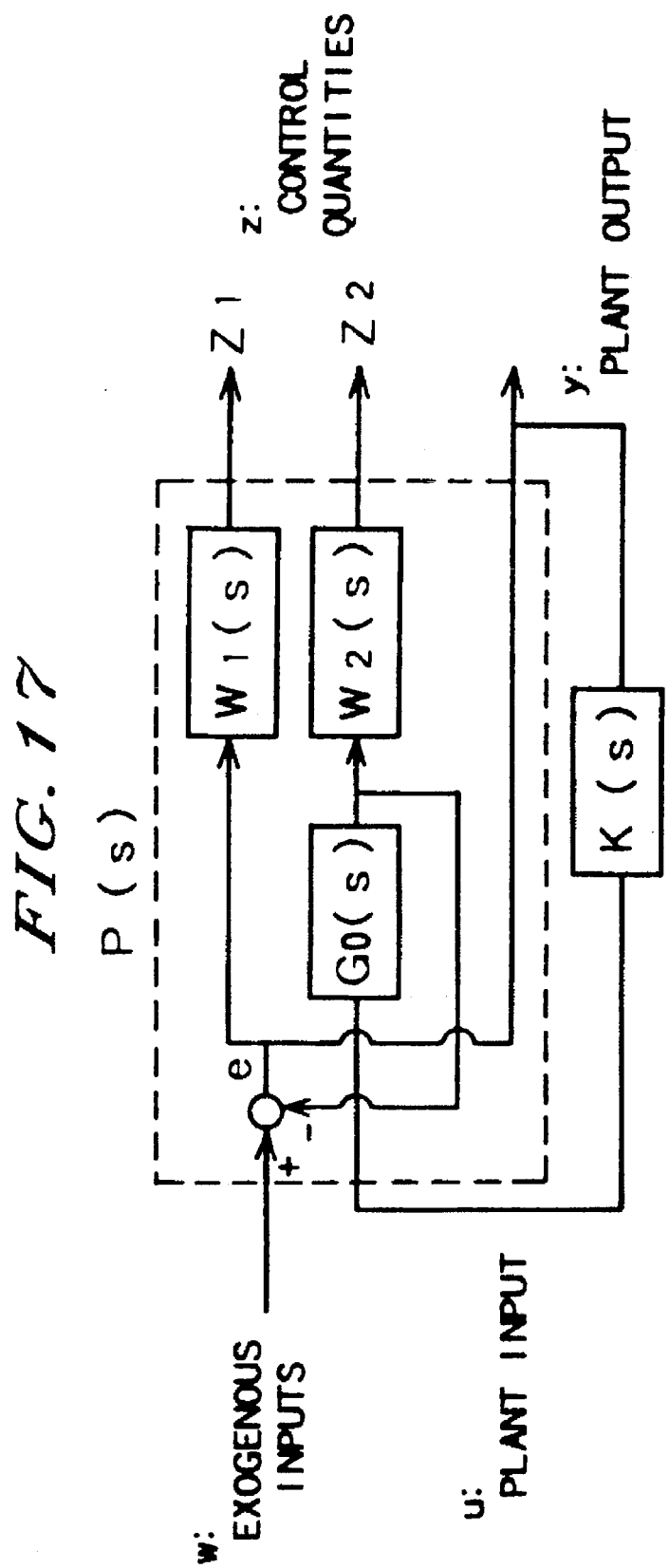
FIG. 17 is a block diagram showing an enlarged control system.

FIG. 17 is a block diagram of the control system by taking account of the weighting functions W1 and W2. In FIG. 17, w denotes exogenous inputs such as the target slip revolution speed NSLP* and disturbance, z (z1, z2) physical quantities to be controlled (the product of the deviation and the weighting function W1 in the frequency domain and the product of the slip revolution speed and the weighting function W2 in the frequency domain), y a plant output observed or the slip revolution speed NSLP detected by a sensor, and u a plant input (duty ratio for determining the current of the linear solenoid valve 52). G0(s), P(s), and K(s) respectively represent a plant, an augmented plant, and a controller. The control system is expressed by a state equation using a variable of state x:

$$dx/dt = A \cdot x + B1 \cdot w + B2 \cdot u \tag{14}$$
$$z = C1 \cdot x + D11 \cdot w + D12 \cdot u$$
$$y = C2 \cdot x + D21 \cdot w + D22 \cdot u$$

The control system is also expressed as a transfer function:

$$\left[\begin{matrix} z(s) \\ y(s) \end{matrix}\right] = P(s) \cdot \left[\begin{matrix} w(s) \\ u(s) \end{matrix}\right] \tag{15}$$

The transfer function matrix of P(s) is shown as an augmented plant including the plant G0(s) and the weighting functions W1 and W2:

$$P(s) = \left[\begin{matrix} W1 & -W1G0 \\ 0 & W2G0 \\ I & -G0 \end{matrix}\right] \tag{16}$$

When the feedback control u(s)=K(s)y(s) is executed by the controller K(s) shown in the block diagram of FIG. 17, the H∞ control problem is to guarantee the stability of the closed loop system with respect to the transfer function Tzw from exogenous inputs w to a control quantity z and obtain the controller K(s) satisfying the inequality $\|Tzw\|_\infty < 1$.

Concrete design process of the clutch slip control device based on the above theory is explained with the flowchart of FIG. 20.

At a first design step (steps S200 and S210), plant characteristics are identified as a numerical model. The numerical model is ideally introduced based on physical or dynamic considerations of a plant. It is, however, difficult to physically describe the dynamics of a frictional joint of the frictional clutch of the embodiment. The experimental identification method is accordingly applied to the embodiment. Physical considerations-based identification of the clutch dynamics as a numerical model may be allowed for other type of plants (clutches) or by introduction of an appropriate quantity of state.

In the embodiment, an identification test is executed first at step S200. A specific signal corresponding to a plant input is generated by a random signal generator. Upon condition that a driving current Isol runs through the linear solenoid valve 52 based on the specific signal, the actual slip revolution speed NSLP is calculated from the engine speed Ne and the input shaft rotating speed Nin. Data of the slip revolution speed NSLP are stored in a storage device as the RAM 86. This identification test is executed under primary operating conditions of a real vehicle and driving conditions of various classes giving characteristic perturbations.

At step S210, a number of data stored in the storage device are processed by least squares method and model parameters ami and bmi, which can represent the output or the slip revolution speed NSLP, are determined according to the following equation:

$$y(k) = \sum_{i=1}^{n} ami \cdot y(k-i) + \sum_{i=0}^{n} bmi \cdot u(k-i-kd) \tag{17}$$

where u, y, k, and n respectively denote a plant input, a slip revolution speed NSLP or a plant output, a parameter representing the current time, and an order; ami and bmi represent model parameters; and Kd represents a dead time before variation in the plant input u actually affects the plant output y.

At step S220, a design model is selected among a number of models determined to be available by the system identification. A characteristic perturbation Δ is then introduced from the design model at step S230. The design model is selected generally based on a primary operating condition. When the operating condition for realizing a smaller characteristic perturbation is significantly different from the primary operating condition, the former may be selected as a design model G0. Once the design model G0 is determined, various characteristic perturbations are obtainable from a perturbed variation model G based on the definition of Equation 3. The characteristic perturbation Δ shown in FIG. 12 is summation of a plurality of characteristic perturbations. FIGS. 14 through 16 illustrate the responses under specific conditions of the models thus determined.

At step S240, the weighting functions W1 and W2, which are key functions of the H∞ controller, are set according to the characteristic perturbation Δ determined at step S230. Here especially important is the weighting function W2 corresponding to the complementary sensitivity function T(s). The weighting function W2 is approximated by an eighth-order function to include characteristic perturbations due to load, turbine revolution speed, and other factors as shown in FIG. 19. In other words, the weighting function W2 in FIG. 19 is illustrated as a curve approximating envelopes of various characteristic perturbations. The weighting functions W1 is, on the other hand, relatively simple as illustrated in FIG. 18. The weighting function W1 is modified several times in a general design cycle to satisfy the design specification.

After the design of the weighting functions W1 and W2, an augmented plant of Equation 16 is created at step S250 and an available controller is then calculated by a predetermined solution at step S260. A typical solution used for the calculation of a controller is DGKF method proposed by Doyle and Glover et al. The DGKF method is described in detail in 'State Space solutions to standard H2 and H∞ control problems' (J. Doyle, K. Glover et al., IEEE Trans. Automat. Contr., AC-34, No. 8, pp.831–847).

After the calculation of the controller, it is determined at step S270 whether the controller satisfies Inequality 12b. In general procedures, the weighting function W1 for defining the sensitivity function S(s) is provisionally set under relatively loose conditions and an available controller is calculated based on the provisional weighting function W1 at an initial stage of design. The setting of the weighting function W1 is then varied gradually so as to make the sensitivity function S(s) small under the condition of Inequality 12b. This procedure is repeated until the sensitivity function S(s) reaches the minimum under the condition of Inequality 12b.

After the controller realizing the sufficient performance is obtained by repeating the process of steps S240 through S270, the controller is converted to a discrete time controller, which is utilized in the real system, at step S280. The process of steps S210 through S280 can be executed with a control system CAD 'MATLAB' ('MATLAB' is trade mark of MATH WORKS INC.).

Figure 21A:
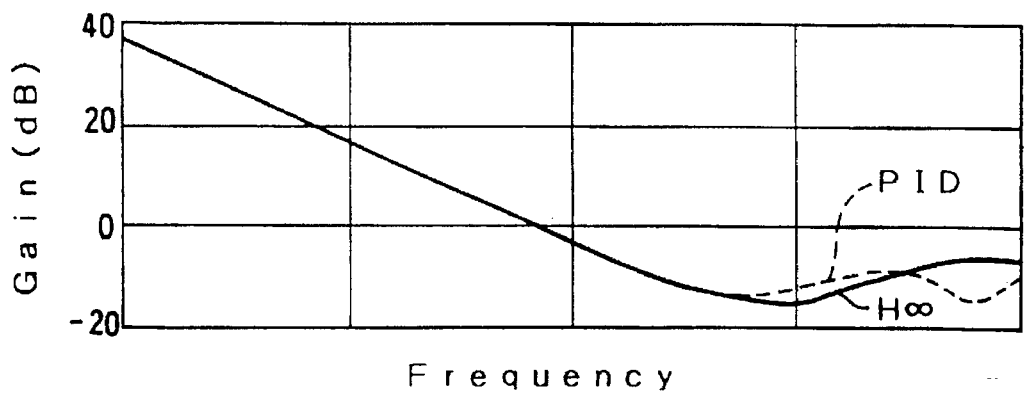
FIGS. 21A and 21B are graphs showing comparison between the control characteristics of the slip control device (H∞ controller) of the embodiment and the conventional PID controller.
Figure 21B:
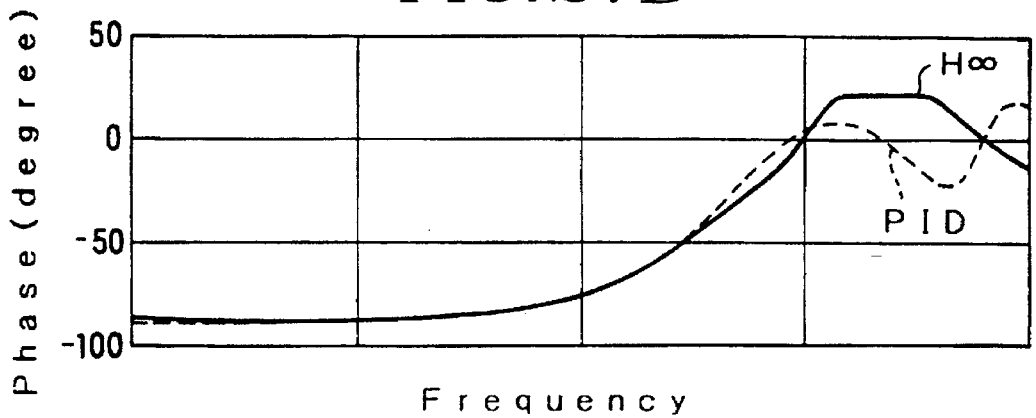

The control characteristics of the H∞ controller thus designed are given by solid lines in the graphs of FIGS. 21A and 21B. For the purpose of comparison, the control characteristics of a PID controller optimally adjusted to fulfill the design characteristics are given by broken lines.

Figure 22:
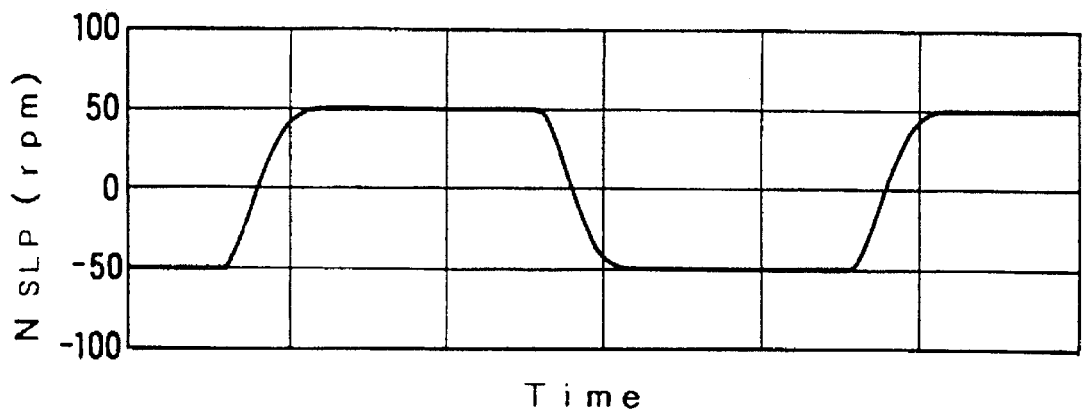
FIG. 22 is a graph showing a variation in the slip revolution speed NSLP at the time of design.
Figure 23:
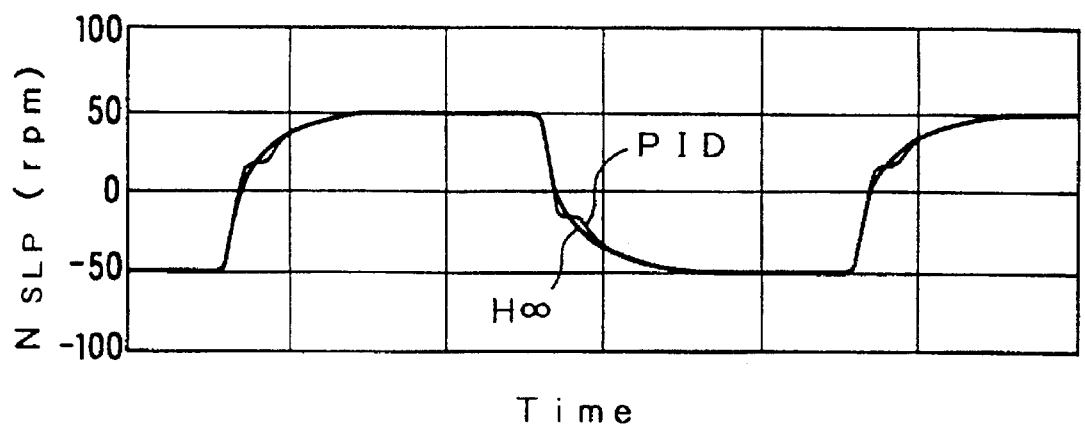
FIG. 23 is a graph showing the control characteristics of the H∞ controller and the conventional PID controller to vary the actual slip revolution speed NSLP against the varied target slip revolution speed NSLP*.
Figure 24:
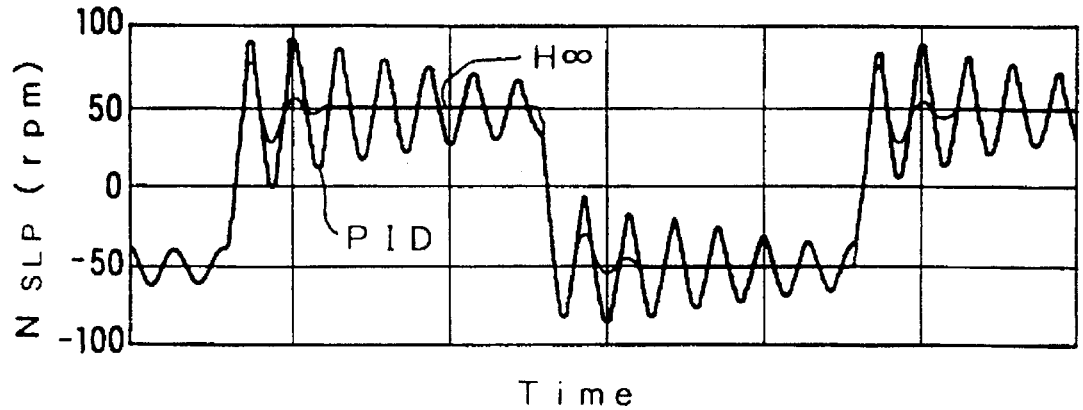
FIG. 24 is a graph showing the responses of the H∞ controller and the conventional PID controller under the condition that the stationary gain of the control system is varied to a 2.5-fold value.

The follow-up characteristics with stepped variations in the target slip revolution speed NSLP* are shown in FIGS. 22 through 24. FIG. 22 shows a variation in the slip revolution speed NSLP at the time of design, and FIG. 23 shows the performance (the actual slip revolution speed NSLP measured) of the H∞ controller and the PID controller at a typical point of variation. The H∞ controller shows a smooth follow-up whereas the PID controller gives a fluctuation. FIG. 24 shows the responses under the condition that the stationary gain of the control system is varied to a 2.5-fold value at the point of variation due to deterioration of the frictional material of the lock-up clutch 32 or the operating oil. While the H∞ controller guarantees sufficient stability with only a little fluctuation, the PID controller gives divergent characteristics.

The slip control device of the first embodiment described above can guarantee the sufficient stability and follow-up characteristics (response) over the characteristic perturbation of the control system due to deterioration of the frictional material of the lock-up clutch 32 or the operating oil.

The method of manufacturing such a slip control device of the embodiment can realize the required control performance without repeating adjustment or cut and error. This reduces the steps of design process and adjustment process, thereby significantly saving the labor and cost for the development.

Figure 25:
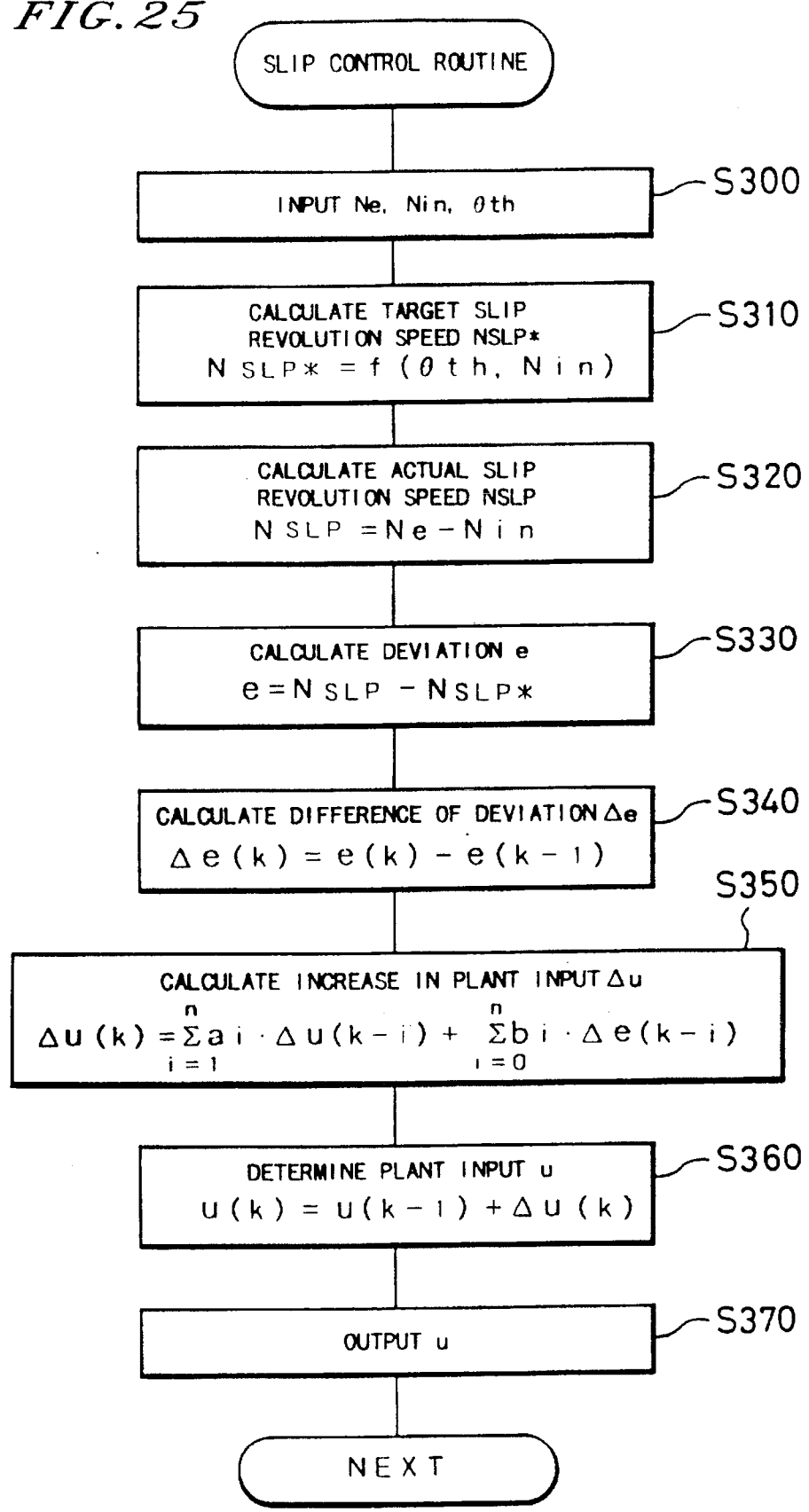
FIG. 25 is a flowchart showing a slip control routine executed in a second embodiment.

In the first embodiment, the control input u(k) is calculated based on the input and output data at step S140 in every cycle of the slip control routine shown in FIG. 5. The control input u(k) may, however, be calculated successively with an increase as shown in the flowchart of FIG. 25. The process of steps S300 through S330 in the flowchart of FIG. 25 is equivalent to that of steps S100 through S130 in the flowchart of FIG. 5. In the second embodiment, a difference Δe in the deviation e is calculated at step S340 after the calculation of the deviation e at step S330. The difference between a current deviation e(k) and a previous deviation e(k−1) is expressed as Δe.

An increase Δu(k) of the plant input u(k) is then calculated at step S350 whereas the control input u(k) or the driving current of the linear solenoid valve 52 is directly calculated at step S140 in the first embodiment. In concrete procedures, the increase Δu(k) of the plant input u(k) is calculated according to the following equation:

$$\Delta u(k) = \sum_{i=1}^{n} ai \cdot \Delta u(k-i) + \sum_{i=0}^{n} bi \cdot \Delta e(k-i) \quad (18)$$

At step S360, a current plant input u(k) is subsequently determined by adding the increase Δu(k) to a previous plant input u(k−1) determined in a previous cycle of the routine. The program then goes to step S370 at which the current plant input u(k) thus determined is output.

The structure of the second embodiment exerts the same effects as the first embodiment and moreover requires a smaller memory for the operation since the operation at step S350 gives a small value as an increase of the plant input u(k).

The control devices of the first and the second embodiments are designed to improve the stability of control over the characteristic perturbation of the plant against the target slip revolution speed. A control device of a third embodiment is designed to eliminate the variation in slip revolution speed against an external disturbance applied onto the plant as well as to realize the above object. The third embodiment has an augmented plant including frequency characteristics from a torque disturbance to a plant output (slip revolution speed) in order; to eliminate the variation in slip revolution speed due to abrupt opening and closing of the throttle valve.

Figure 26:
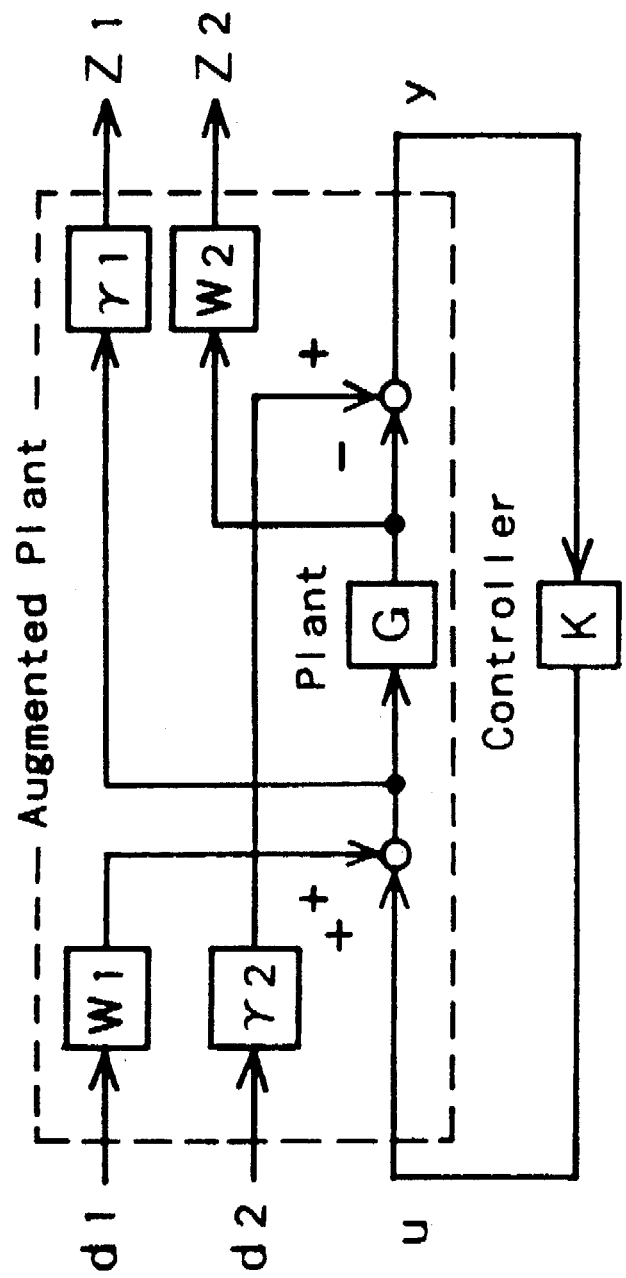
FIG. 26 is a block diagram illustrating an enlarged control system in a third embodiment.

FIG. 26 is a block diagram showing the control system of the third embodiment, which corresponds to the block diagram of FIG. 17 to solve the mixed sensitivity problem in the first and the second embodiments. In FIG. 26, W1 and W2 represent weighting functions like the first and the second embodiments, and γ1 and γ2 denote scalar weights. In the third embodiment, the sensitivity function S for defining the response is a transfer function from a first torque disturbance d1 to a first control quantity z1 to be evaluated while the complementary sensitivity function T for defining the stability is a transfer function from a second torque disturbance d2 to a second control quantity z2 to be evaluated. On the assumption that the torque disturbance is applied to the input of a plant G, a transfer function from the torque disturbance to the output is expressed as a transfer from the first torque disturbance d1 to the second control quantity z2 to be evaluated. The transfer function from the torque disturbances d1 and d2 to the control quantities z1 and z2 to be evaluated are expressed as:

$$\begin{bmatrix} z1 \\ z2 \end{bmatrix} = \begin{bmatrix} \gamma1W1(s)S(s) & \gamma1\gamma2K(s)S(s) \\ W1(s)W2(s)G(s)S(s) & \gamma2W2(s)T(s) \end{bmatrix} \begin{bmatrix} d1 \\ d2 \end{bmatrix} \quad (19)$$

Inequality 20 given below, which corresponds to Inequality 12b of the first embodiment, is introduced as an evaluation index used for determination of the controller:

$$\left\| \begin{matrix} \gamma1W1S & \gamma1\gamma2KS \\ W1W2GS & \gamma2W2T \end{matrix} \right\|_\infty < 1 \quad (20)$$

The terms to be considered in Equation 19 are γ1W1S, γ1γ2KS, W1W2GS, and γ2W2T, where the term γ1γ2KS is required for solution of Equation 19. The structure of the third embodiment positively takes account of the variation in slip revolution speed against the torque disturbance d1, thus improving the suppression against the torque disturbance. Although the torque disturbance is applied to the input of the plant in the structure of FIG. 26 as a matter of convenience, the control device may be designed based on the precise modeling of the torque disturbance.

The slip control device of the invention is not restricted to the structures of the first through the third embodiments in any sense. There may be many modifications, alterations, and changes without departing from the scope or spirit of essential characteristics of the invention. Examples of other possible structures include: that of realizing a process equivalent to the operation of step S140 in the flowchart of FIG. 5 by combining a high-order low-pass filter with the conventional PID control; that of approximating the characteristic perturbation by any of third-order through seventh-order functions or a ninth or higher-order function; and that of installing a specific multiplier for executing the operation of step S140.

Figure 27:
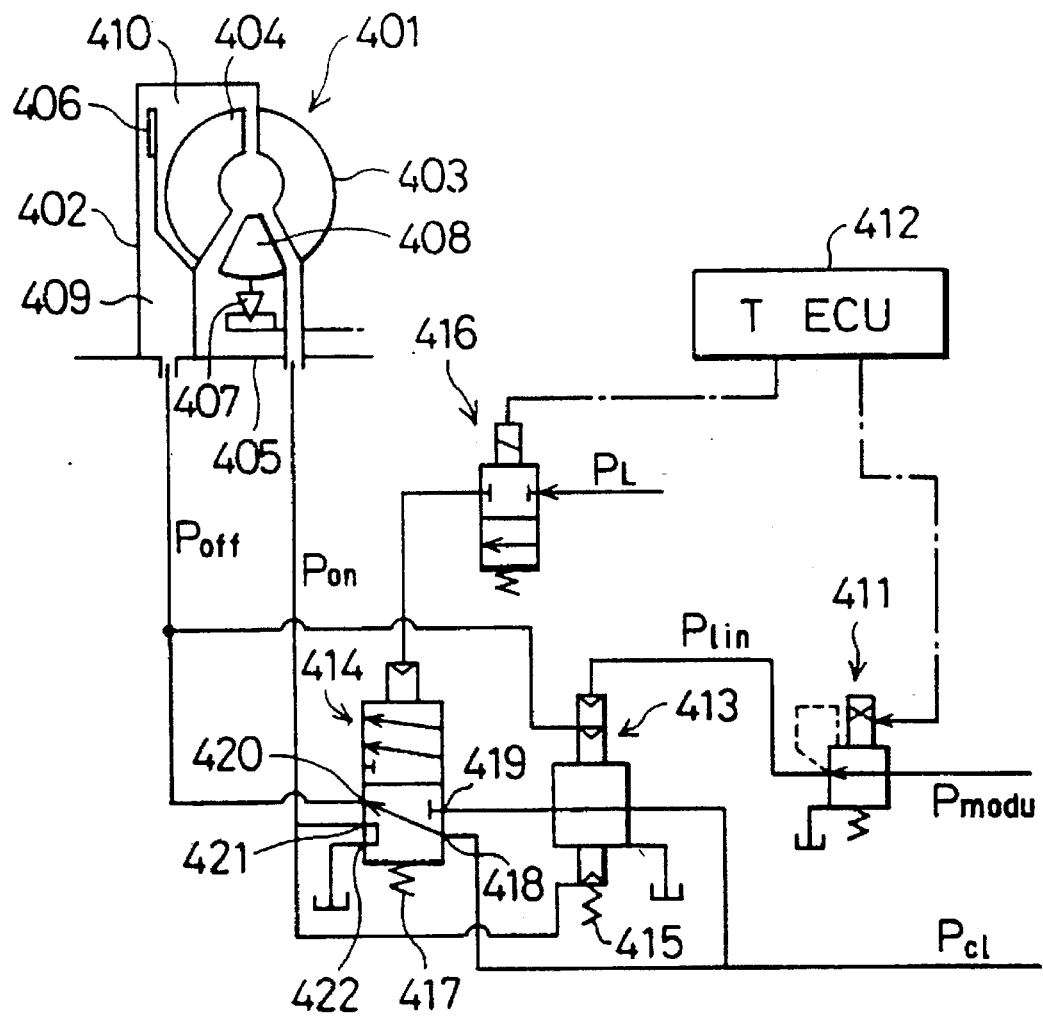
FIG. 27 schematically illustrates another slip control device as a fourth embodiment.

FIG. 27 schematically shows another clutch slip control device as a plant, that is, the object to be controlled, in a fourth embodiment. The structure of the clutch slip control device of the fourth embodiment is substantially the same as that of the first embodiment shown in FIG. 1. A torque converter 401 of an automatic transmission is provided with a turbine runner 404, which is disposed opposite to a pump impeller 403 integrally formed with a front cover 402 connecting with an engine (not shown). The turbine runner 404 is connected to an input shaft 405 of the automatic transmission, which is further joined with a lock-up clutch 406. The lock-up clutch 406 is disposed to face the inner wall of the front cover 402 and brings into contact with and separates from the inner wall of the front cover 402 according to the application and discharge of oil pressure. A stator 408 linked with a predetermined fixing portion via a one-way clutch 407 is interposed between the pump impeller 403 and the turbine runner 404.

The lock-up clutch 406 is interposed between a release oil chamber 409, which is near to the front cover 402, and an engagement oil chamber 410 to separate the oil chambers from each other. The lock-up clutch 406 is separated from the inner wall of the front cover 402 to be in a release position by means of the application of oil pressure to the release oil chamber 409 and the discharge of oil pressure from the engagement oil chamber 410. The lock-up clutch 406 is pressed against the inner wall of the front cover 402 to be in an engagement position, on the contrary, by means of the application and discharge of oil pressure in a reverse direction. The lock-up clutch 406 is slip controlled, that is, in a slip contact with the front cover 402, by regulating the difference in oil pressure between the release oil chamber 409 and the engagement oil chamber 410.

A linear solenoid valve 411 arranged in a circuit for controlling the engagement oil pressure of the lock-up clutch 406 regulates a modulator pressure Pmodu, which is obtained through adjustment of the line pressure, based on a duty ratio input from an electronic control unit 412. The linear solenoid valve 411 then outputs a controlled signal pressure Plin to a lock-up control valve 413. The lock-up control valve 413 having an oil pressure regulated by a secondary regulator valve (not shown) as an initial pressure controls the oil pressure and outputs the controlled oil pressure to a lock-up relay valve 414. The lock-up control valve 413 receives the signal pressure Plin at an input terminal disposed opposite to a spring 415 via a spool. An oil pressure Poff of the release oil chamber 409 is applied onto an input terminal of the lock-up control valve 413 disposed on the same side as that of the signal pressure Plin while an oil pressure Pon of the engagement oil chamber 410 is applied onto another input terminal near the spring 415. The lock-up control valve 413 appropriately sets the pressure control level according to the oil pressures Plin, Poff and Pon as well as the elasticity of the spring 415 and eventually outputs the oil pressure corresponding to the pressure control level to the lock-up relay valve 414.

The lock-up relay valve 414 is switched by application of a line pressure PL selectively supplied via a solenoid valve 416 on an input terminal of the lock-up relay valve 414 arranged opposite to a spring 417 via a spool. The lock-up relay valve 414 has a first port 418 receiving a regulator pressure PCl controlled by the secondary regulator valve, a second port 419 receiving the oil pressure output from the lock-up control valve 413, a third port 420 connecting with the release oil chamber 409, and a fourth port 421 connecting with the engagement oil chamber 410.

Under the condition that the solenoid valve 416 is in its OFF position as illustrated in FIG. 27, the first port 418 of the lock-up relay valve 414 is connected to the third port 420 to apply the regulator pressure PCl to the release oil chamber 409. The second port 419 is closed, and the fourth port 421 is connected to a drain port 422 to discharge the oil pressure from the engagement oil chamber 410. The lock-up clutch 406 is disconnected from the inner wall of the front cover 402 to be in the release position by the application of oil pressure to the release oil chamber 409 and the discharge of oil pressure from the engagement oil chamber 410.

Under the condition that the solenoid valve 416 is in its ON position, on the contrary, the oil pressure is applied in a direction opposite to the spring 417 to move the spool, so that the first port 418 is connected to the fourth port 421, and the second port 419 to the third port 420. The regulator pressure PCl is applied to the engagement oil chamber 410 while the oil pressure controlled by the lock-up control valve 413 is applied to the release oil chamber 409. The lock-up clutch 406 is pressed against the inner wall of the front cover 402 to be in the engagement position by setting a lower pressure control level in the lock-up control valve 413 to decrease the oil pressure of the release oil chamber 409. A higher pressure control level set in the lock-up control valve 413 increases the oil pressure of the release oil chamber 409 and reduces the load of pressing the lock-up clutch 406 against the inner wall of the front cover 402. The slip condition of the lock-up clutch 406 is controlled by regulating the pressure control level of the lock-up control valve 413.

Figure 28:
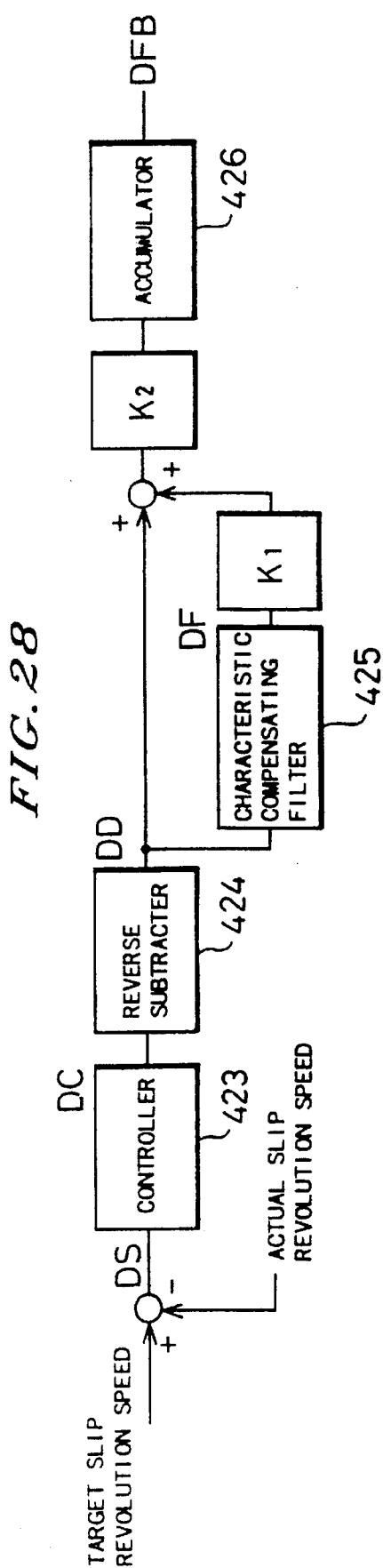
FIG. 28 is a block diagram of a feedback control system in the fourth embodiment.

The slip control of the lock-up clutch 406 is implemented by determining a target slip based on the driving condition corresponding to the engine speed, the throttle valve travel, and the vehicle speed and executing the feedback control to make the actual slip coincident with the target slip. In concrete procedures, the duty ratio of the linear solenoid valve 411 is determined based on a feed-forward control for setting a target slip and a feedback control for making the actual slip coincident with the target slip. The feedback control is executed using expressions of the discrete transfer functions described in the first through the third embodiments. An example of the available feedback control system is illustrated in the block diagram of FIG. 28.

A deviation DS of the actual slip revolution speed from a target slip revolution speed is input to a controller 423, which subsequently generates a controller output DC by executing an operation expressed as:

$$DCi = \sum_{n=1}^{m} (An \cdot DCi - n) + \sum_{n=0}^{m} (Bn \cdot DSi - n) \quad (21)$$

where An and Bn represent controller coefficients of the controller 423, which correspond to the first and the second controller coefficients ai and bi determined by the design process shown in FIG. 20.

The controller output DC generated by the controller 423 is received by a reverse subtracter 424, which calculates a difference DD between the current controller output and a previous controller output. The difference DD is input into a characteristic compensating filter 425, which executes an operation expressed as:

$$DFi = \sum_{n=1}^{L} (an \cdot DFi - n) + \sum_{n=0}^{L} (bn \cdot DDi - n) \quad (22)$$

where an and bn represent filter coefficients.

A filter output DF thus obtained is multiplied by a predetermined filter gain K1 and then added to the difference or filter input DD. The sum (DF·K1+DD) is further multiplied by an output gain K2 and input into an accumulator 426, which adds the current input to a value stored therein and outputs the total as a final output DFB.

As shown in Equations 21 and 22, the feedback control system determines the final output by taking account of past data, which are obtained in the current cycle through in the cycle executed a plurality of times before and include the deviations of slip revolution speed, the controller outputs, the differences, and the filter outputs. This may cause the following problems. Once some error is given to data due to an electric failure or noise, the wrong data are taken into the operation at least m times for Equation 21 and at least L times for Equation 22. The operation with the wrong data may result in a significant error in the final output. The system of the embodiment accordingly has a guarding mechanism of setting an upper limit and a lower limit with respect to the deviation of slip revolution speed DS input into the controller 423 and setting a fixed range in the difference DD input into the characteristic compensating filter 425.

Irrespective of the guarding process for the inputs into the controller 423 and the characteristic compensating filter 425, the feedback control, which accumulates the past data, may result in overflow of the controller output DC or the filter output DF. The operations described above are executed by a microcomputer while the processed data are successively stored in a RAM. However, since the RAM has only a limited capacity allocated to each data, the data exceeding the allowable capacity cause the discontinuation of operation. Although such problem is solved by using a large-capacity RAM or allowing dynamic allocation of the storage capacity in the RAM according to the requirements, this requires an undesirably large system or complicated process.

The control device of the fourth embodiment accordingly has a specific function of discontinuing the operation at the time of data overflow, substituting the value '0' into the final output DFB, and initializing the past data used in the operation. In concrete procedures, all the past data of the deviation of slip revolution speed DSi-n and the controller output DCi-n (n=1 to m) in Equation 21 and the filter input DDi-n and the filter output DFi-n (n=1 to L) in Equation 22 are initialized to zero. This means that the feedback control starts all over again. Data taken into the control equations in the re-started feedback control procedures consist of newly detected data and results of operation for the newly detected data. Unlike the simple guarding process of forcibly setting only one data equal to a threshold, this mechanism makes the final output converge to a desired value and prevents divergence of the feedback control.

The duty ratio of the linear solenoid valve 411 used for the slip control of the lock-up clutch 406 is determined as a sum of the feedback control and the feed-forward control. The slip control of the lock-up clutch 406 can thus be continued even when the final output DFB of feedback control is initialized to zero. This means that the initialization of the feedback control does not fix the deviation of slip revolution speed DS input into the controller 423 to the value '0' and that the slip control based on the inputs of detected values is allowed to continue to make the actual slip revolution speed close to the target slip revolution speed.

Figure 29:
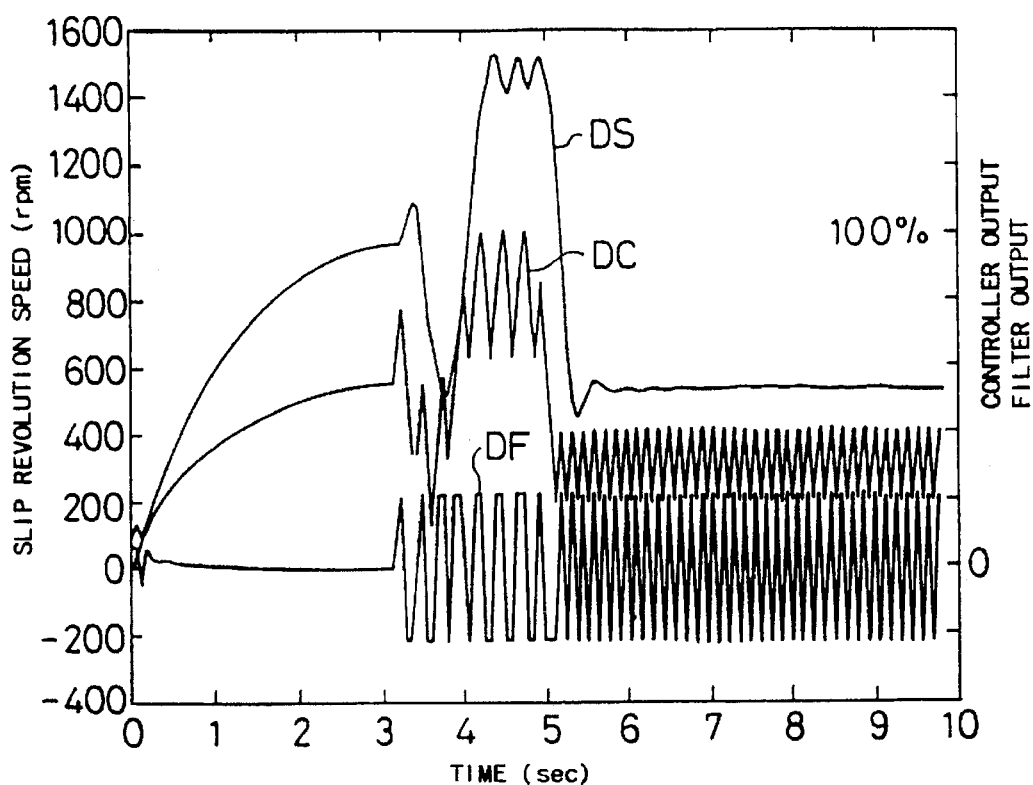
FIG. 29 is a graph showing a control process when an overflow causes an error in past data of controller outputs.

FIG. 29 shows observed curves of the deviation DS of slip revolution speed, the controller output DC, and the filter output DF under the condition that some error arises due to an overflow of one of the past data of controller outputs DC. The error causes divergence of the feedback control wherein the target slip revolution speed is set equal to 50 rpm. The diverged control results in converting the controller output DC and the filter output DF to pulses of fixed cycles and fixing the deviation DS of the actual slip revolution speed from the target slip revolution speed to a large value. Such troubles can be avoided by re-starting the operation after initialization of the final output DFB and all the past data to zero.

Even upon the condition that no error is produced in data in the process of operation, the results of operation, the controller output DC and the filter output DF, may overflow. This is partly attributable to quantizing errors. Although the control by Equations 21 and 22 is preferably executed by the floating decimal point operation which can always guarantee the sufficient precision, the fixed decimal point operation may, however, be applied by considering the processing speed and the available capacity in the RAM. In the latter operation procedures, the quantizing errors are not negligible in relatively small data and may significantly lower the precision. Under the stationary driving conditions, the quantizing errors are often accumulated on the same side, that is, either the positive side or the negative side. Accumulation of the quantizing errors may result in data overflow. In the control device of the embodiment, the current controller output DC and the filter output DF as well as their past data DCi-n (n=1 to m) and DFi-n (n=1 to L) used in Equations 21 and 22 are forcibly set equal to either an upper threshold or a lower threshold, which are limits of an allowable range. When the actual slip revolution speed approaches the target slip revolution speed as a result of the slip control with the past data of controller outputs thus defined, the controller input or deviation DS becomes smaller and the controller output DC gradually converges to a certain value in the allowable range.

Figure 30:
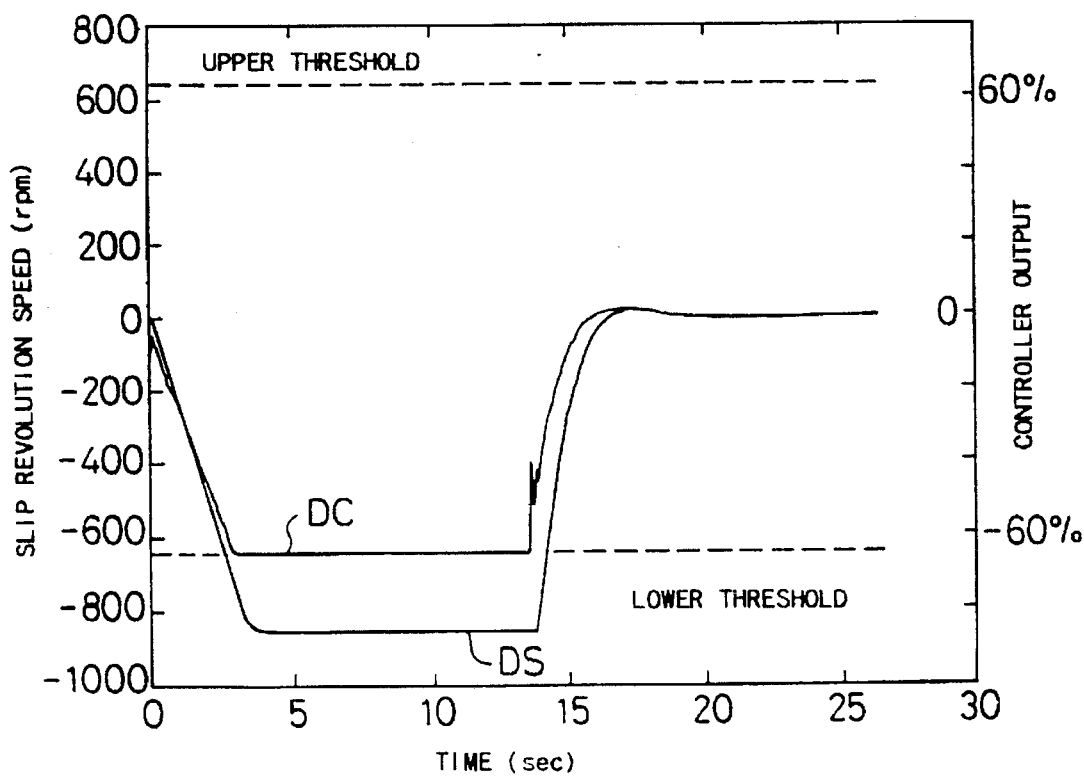
FIG. 30 is a graph showing a control process when the current controller output DC as well as past data are forcibly set equal to either an upper threshold or a lower threshold.
Figure 31:
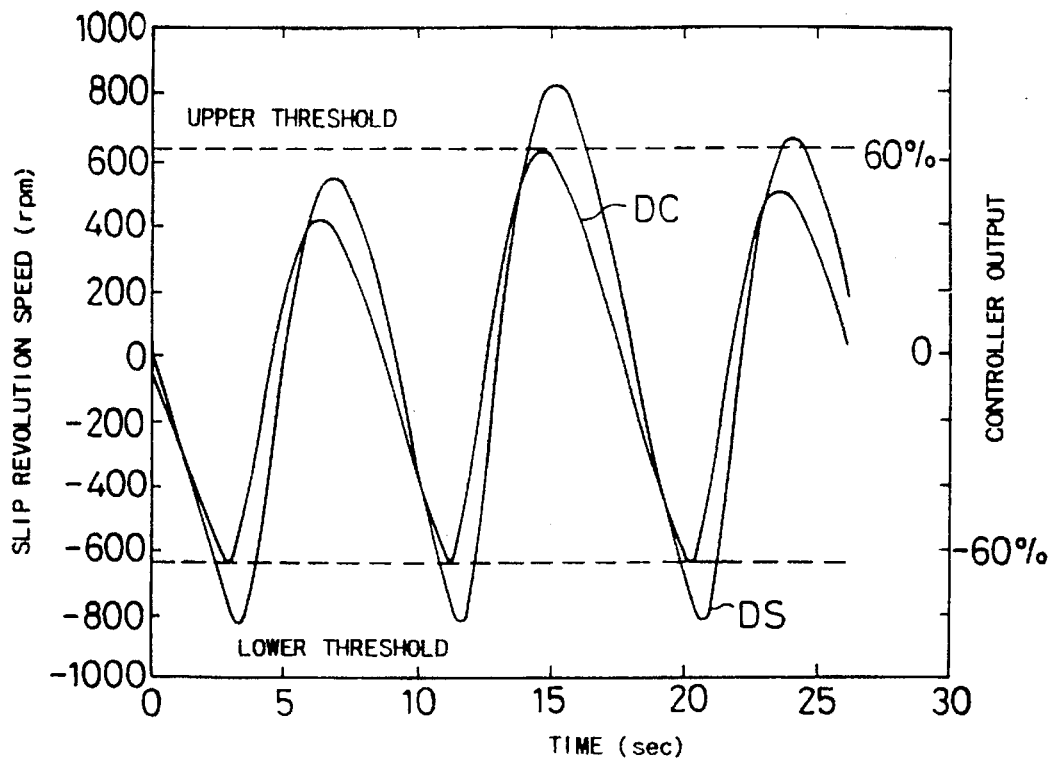
FIG. 31 is a graph showing a control process when only the current controller output DC is set equal to a threshold.

FIG. 30 shows an example of the feedback control where past data of controller outputs are forcibly set equal to either an upper threshold or a lower threshold, which are limits of an allowable range. In this example, at a time point 0, a large deviation from a target slip revolution speed 0 rpm is temporarily input into the controller 423, which causes an overflow of the controller output DC. The guarding mechanism described above forcibly sets the past data of controller outputs DC equal to the lower threshold. When the significantly large deviation input into the controller 423 is canceled, the actual slip revolution speed gradually approaches the target slip revolution speed. The time period required for the approach is approximately 15 seconds in the example of FIG. 30. The approach minimizes the deviation data input into the controller 423, which are successively taken as controller inputs and used for the operation, and allows the controller output DC to converge to a certain value in the allowable range. Eventually, the actual slip revolution speed becomes coincident with the target slip revolution speed (0 rpm in the example). In a conventional method of setting only the current controller output DC obtained by the operation equal to a threshold value, past data of controller outputs DC are used for the operation to cause an error in the subsequent outputs. This results in a large fluctuation of the controller output DC between the upper threshold and the lower threshold as shown in FIG. 31. The fluctuation of the controller output DC prevents the actual slip revolution speed from approaching the target slip revolution speed but causes a large fluctuation of the deviation DS of the actual slip revolution speed from the target slip revolution speed as illustrated in FIG. 31.

Figure 32:
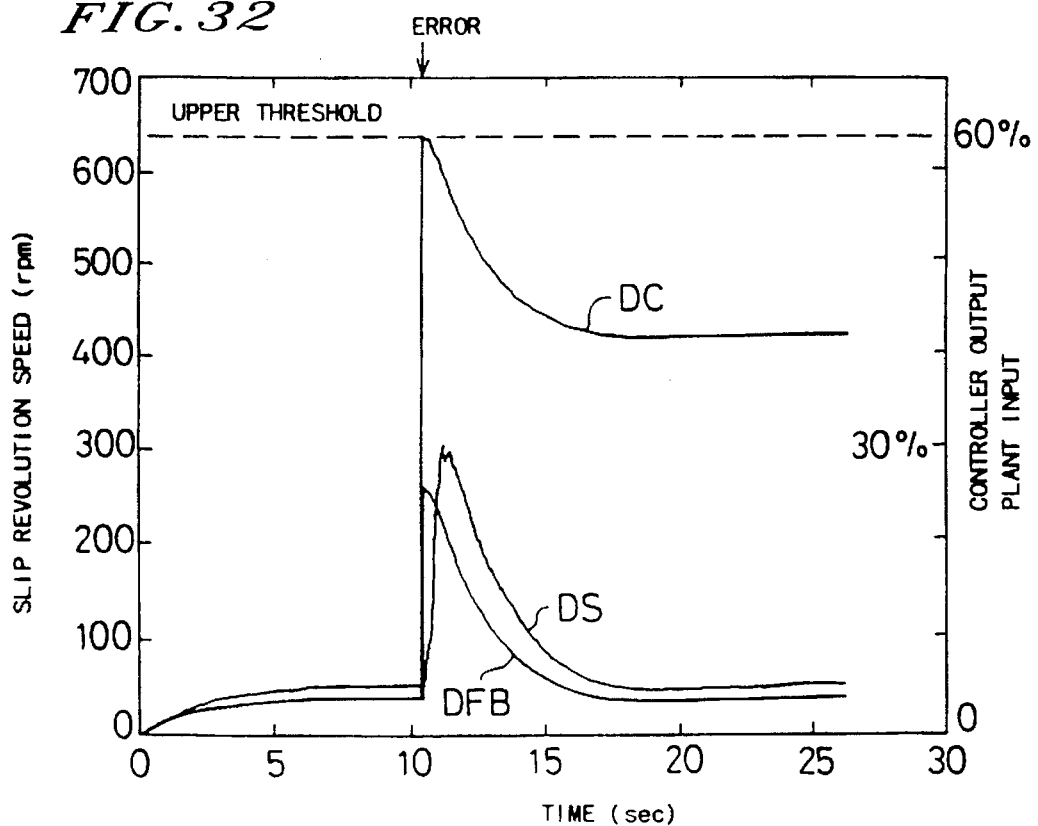
FIG. 32 is a graph showing a control process of the fourth embodiment.
Figure 33A:
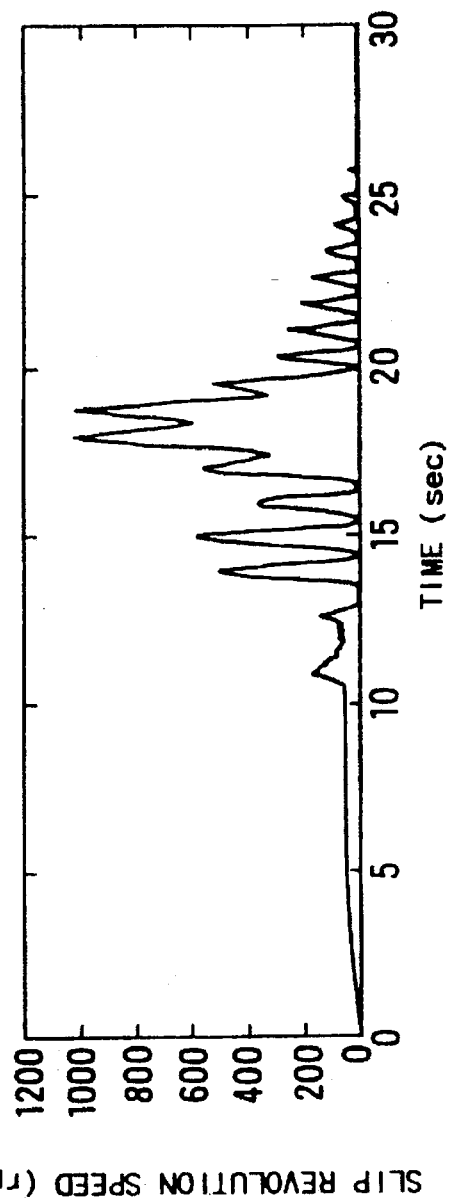
FIGS. 33A and 33B are graphs showing a control process when past data are used for operation under the error-generating condition.
Figure 33B:
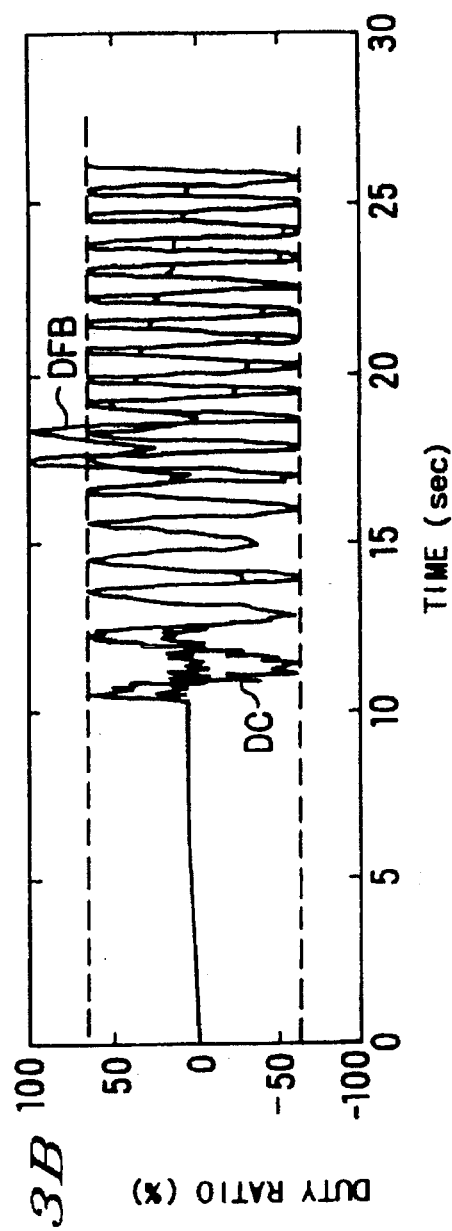

Once the controller output DC overflows due to an error, the control device of the embodiment sets the current controller output DC as well as the past data thereof equal to a threshold. As illustrated in FIG. 32, the controller output DC and the final output DFB accordingly converge to predetermined values in the allowable range whereas the actual slip revolution speed becomes coincident with the target slip revolution speed (50 rpm in this example). When only one controller output causing an error is set equal to a threshold and past data of controller outputs previously stored are used for the operation, on the other hand, the forcibly-set threshold affects the subsequent operation to make the controller output DC diverge and deviate the final output DFB and the slip revolution speed from normal values as shown in FIGS. 33A and 33B.

Figure 35:
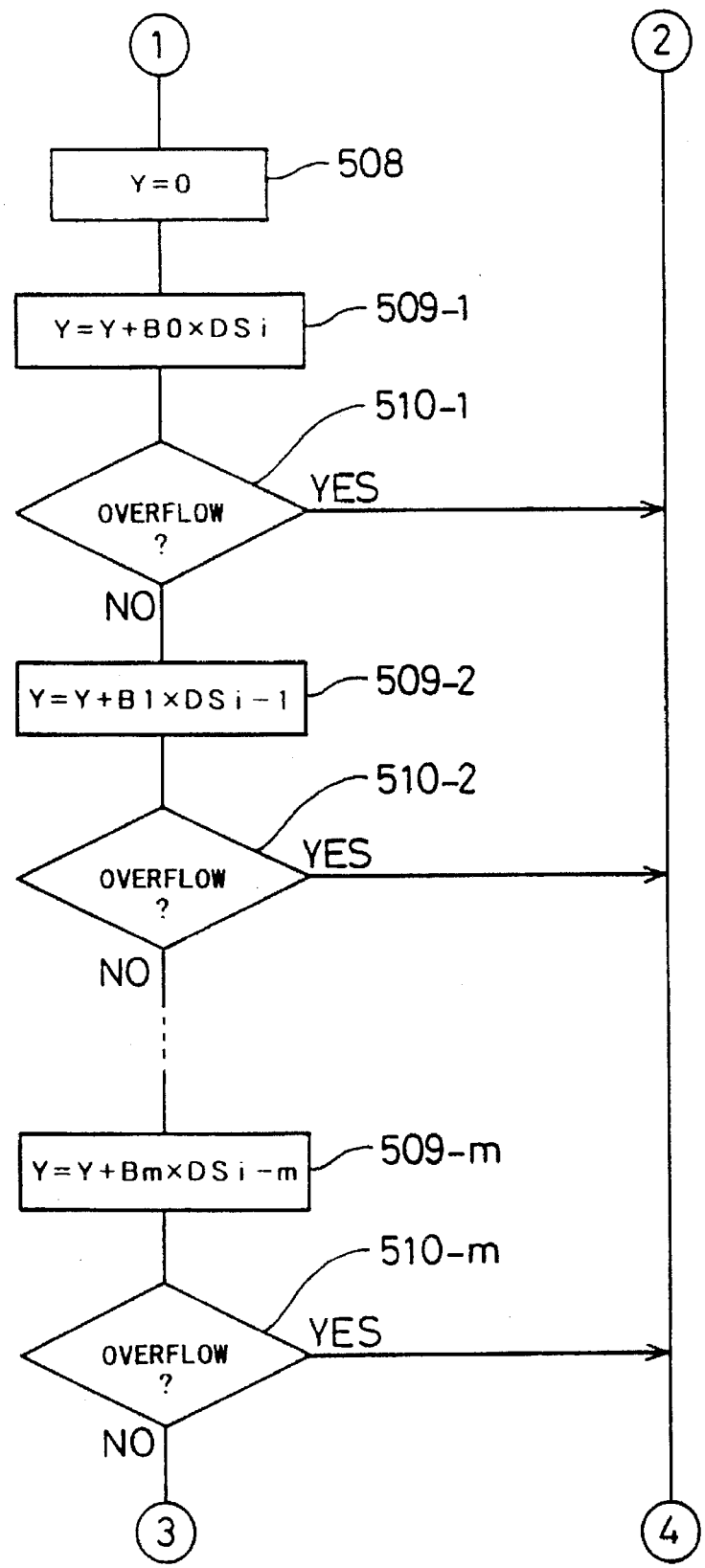
Figure 36:
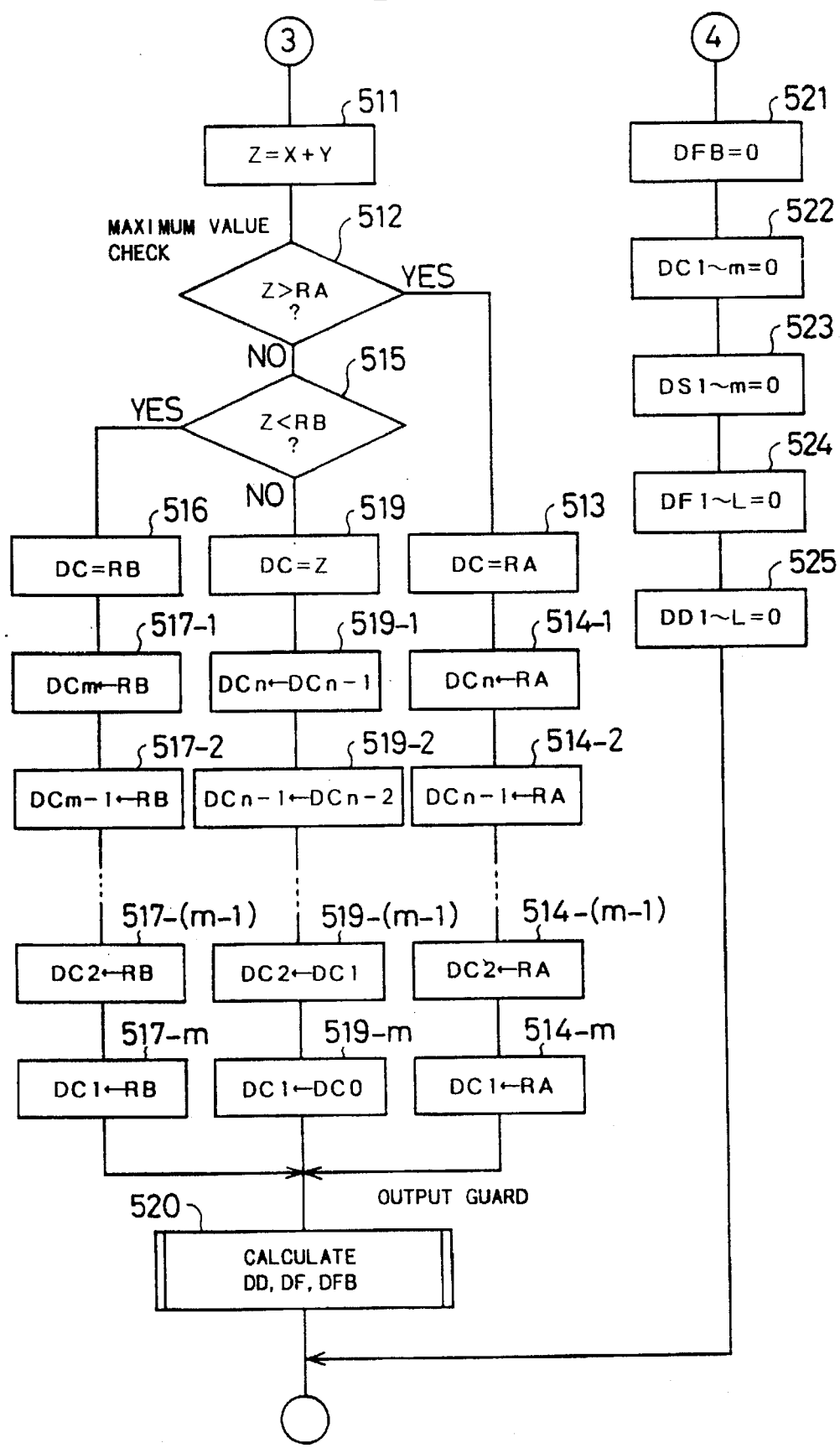

The input-output guarding process and the control against an overflow in the course of operation are shown by the flowcharts of FIGS. 34 through 36. When the program enters the routine shown in FIG. 34, operation and determination of an overflow are executed first for a first parameter based on the controller output DC. The first parameter is equivalent to the first term of the right side of Equation 21 and hereinafter referred to as accumulation X. In concrete procedures, after the accumulation X is initialized to zero at step S500, a past controller output DCi-n, which is obtained in an i-th processing cycle of a discrete system, is multiplied by a corresponding coefficient An and the product An x DCi-n is accumulated from n=1 to m (steps S502-1, S502-2, . . . , S502-m). After every accumulating step, it is determined whether the accumulation X overflows or not (steps S503-1, S503-3, . . . , S503-m).

When no overflow is observed, the program goes to steps S504 through S507 to execute the guarding process for the slip deviation DS (deviation between the target slip revolution speed and the actual slip revolution speed) input into the controller 423. In concrete procedures, the slip deviation DS is compared with an upper threshold DSMAX at step S504. When DS>DSMAX, the program proceeds to step S505 at which the slip deviation DS or the controller input is set equal to the upper threshold DSMAX. When DS is not greater than DSMAX at step S504, on the contrary, the program goes to step S506 at which the slip deviation DS is compared with a lower threshold DSMIN. When DS<DSMIN, the program goes to step S507 at which the slip deviation DS or the controller input is set equal to the lower threshold DSMIN. When the slip deviation DS is within an allowable range defined by the upper threshold DSMAX and the lower threshold DSMIN at steps S504 and S506, the program goes to step S508 in the flowchart of FIG. 35.

The flowchart of FIG. 35 shows control steps of executing an operation of a second parameter based on the slip deviation DS and determining an overflow in the process of operation. The second parameter is equivalent to the second term of the right side of Equation 21 and hereinafter referred to as accumulation Y. In concrete procedures, after the accumulation Y is initialized to zero at step S508, a past controller input DSi-n, which is obtained in an i-th processing cycle of a discrete system, is multiplied by a corresponding coefficient Bn and the product Bn x DSi-n is accumulated from n=0 to m (steps S509-1, S509-2, . . . , S509-m). After every accumulating step, it is determined whether the accumulation Y overflows or not (steps S510-1, S510-3, . . . , S510-m).

When no overflow is observed, the program goes to step S511 in the flowchart of FIG. 36 at which a total Z or the value of Equation 21 corresponding to the controller output is calculated by adding the accumulation X to the accumulation Y. The program then proceeds to steps S512 through S519 to execute the guarding process for the total Z. In concrete procedures, the total Z is compared with a predetermined maximum RA at step S512. When Z>RA, the program goes to step S513 at which the current controller output DC is set equal to the maximum RA and subsequently to steps S514-1 through S514-m at which all the past data DCn (n=1 to m) of the controller output are set equal to the maximum RA. When the total Z is not greater than the maximum RA at step S512, on the other hand, the program proceeds to step S515 at which the total Z is compared with a predetermined minimum RB. When Z<RB, the program goes to step S516 at which the current controller output DC is set equal to the minimum RB and subsequently to steps S517-1 through S517-m at which all the past data DCn (n=1 to m) of the controller output are set equal to the minimum RB.

When the total Z is within an allowable range defined by the maximum RA and the minimum RB, the total Z is applied as the current controller output DC at step S518 and all the past data DCn are set equal to the respective previous data in time series at steps S519-1 through 519-m (for example, DC1 to DC0 and DCm to DCm-1). At step S520, the filter input DD, the filter output DF, and the final output DFB are then calculated using the values obtained above.

When an overflow is observed in the process of operation of the accumulation X or the accumulation Y, that is, when the answer is YES at any of steps S503-1 through 503-m and S509-1 through 509-m, the program goes to step S521 at which the final output DFB is set equal to zero. All the past data DC1 through DCm of the controller output, past data DS1 through DSm of the slip deviation, past data DF1 through DFL of the filter output and past data DD1 through DDL of the filter input are respectively equal to zero at steps S522 through S525.

In the fourth embodiment which executes the control procedures when an overflow is observed in the process of operation, the past data are reset to zero. In an alternative structure, the past data may be set equal to an initial value used prior to the overflow.

When this structure is applied to the slip control of a lock-up clutch, the hydraulic circuit for controlling the lock-up clutch is not limited to the structure shown in FIG. 27. The guarding mechanism in the feedback control system based on expressions of discrete transfer functions may be applied to any control devices for various functional members of the vehicle, for example, applicable to a device for controlling the idling speed of the engine.

The scope and spirit of the present invention are limited only by the terms of the appended claims.

What is claimed is:

1. A clutch slip control device comprising:

slip revolution speed detecting means for detecting an actual slip revolution speed of a clutch;

memory means for storing constants set to satisfy response and stability of a feedback control system of slip conditions of said clutch, said constants being determined by a high-order function approximating variation in input-output frequency characteristics of a plant input for actuating said clutch and of said actual slip revolution speed;

first calculation means for calculating a first parameter using said constants stored in said memory means, said first parameter discretely reflecting past data of said plant input, which are obtained in a current feedback control cycle and in a plurality of preceding feedback control cycles;

second calculation means for calculating a second parameter using said constants stored in said memory means, said second parameter discretely reflecting past data of a deviation of said actual slip revolution speed from a target slip revolution speed, which are obtained in said current feedback control cycle and in said plurality of preceding feedback control cycles;

plant input determination means for determining a next plant input based on said first parameter and said second parameter calculated by said first calculation means and said second calculation means, so as to make said actual slip revolution speed coincident with said target slip revolution speed; and controlling means for adjusting slip conditions of said clutch by actuating said clutch with said next plant input.

2. The clutch slip control device in accordance with claim 1, wherein said first calculation means and said second calculation means calculate said first parameter and said second parameter as past information of at least five orders.

3. The clutch slip control device in accordance with claim 1, further comprising:

out-of-range detecting means for detecting that at least one of said first parameter and said second parameter is out of a predetermined allowable range and outputting a detecting result; and setting means for setting next said plant input equal to a fixed value and initializing said first parameter and said second parameter in response to said result outputted by said out-of-range detecting means.

4. The clutch slip control device in accordance with claim 1, further comprising:

out-of-range detecting means for detecting that said next plant input determined by said plant input determination means is out of a predetermined allowable range and outputting a detecting result; and threshold setting means for setting said next plant input and said first parameter equal to predetermined threshold values in response to said result outputted by said out-of-range detecting means.

5. A method of clutch slip control, comprising the steps of:

(a) detecting an actual slip revolution speed of a clutch;

(b) storing constants set to satisfy response and stability of a feedback control system of slip conditions of said clutch, said constants being determined by a high-order function approximating variation in input-output frequency characteristics of a plant input for actuating said clutch and of said actual slip revolution speed;

(c) calculating a first parameter using said constants stored in said step (b), said first parameter discretely reflecting past data of said plant input, which are obtained in a current feedback control cycle and in a plurality of preceding feedback control cycles;

(d) calculating a second parameter using said constants stored in said step (b), said second parameter discretely reflecting past data of a deviation of said actual slip revolution speed from a target slip revolution speed, which are obtained in said current feedback control cycle and in said plurality of preceding feedback control cycles;

(e) determining a next plant input based on said first parameter and said second parameter calculated in said steps (c) and (d), so as to make said actual slip revolution speed coincident with a target slip revolution speed; and (f) adjusting slip conditions of said clutch actuating said clutch with said next plant input.

6. The method in accordance with claim 5, wherein said first parameter and said second parameter are calculated as past information of at least five orders.

7. The method in accordance with claim 5, further comprising the step of:

(g) setting said next plant input equal to a fixed value and initializing said first parameter and said second parameter, when at least one of said first parameter and said second parameter is out of a predetermined allowable range.

8. The method according to claim 5, further comprising the step of:

(g) setting said next plant input equal to a fixed value and initializing said first parameter when, when said next plant input determined in step (e) is out of a predetermined allowable range.

9. A vehicle control device comprising:

control target detecting means for detecting an actual control quantity of a plant or control target which is mounted on a vehicle;

memory means for storing constants set to satisfy response and stability of a feedback control system of conditions of said plant, said constants being determined by a high-order function approximating variation in input-output frequency characteristics of a plant input and of said actual control quantity;

first calculation means for calculating a first parameter using said constants stored in said memory means, said first parameter discretely reflecting past data of said plant input, which are obtained in a current feedback control cycle and in a plurality of preceding feedback control cycles;

second calculation means for calculating a second parameter using said constants stored in said memory means, said second parameter discretely reflecting past data of a deviation of said actual control quantity from a target control quantity, which are obtained in said current feedback control cycle and in said plurality of preceding feedback control cycles;

plant input determination means for determining a next plant input based on said first parameter and said second parameter calculated by said first calculation means and said second calculation means, so as to make said actual control quantity coincident with said target control quantity;

out-of-range detecting means for detecting that at least one of said first parameter and said second parameter is out of a predetermined allowable range and outputting a detecting result;

setting means for setting said next plant input equal to a fixed value and initializing at least said first parameter in response to said result outputted by said out-of-range detecting means; and controlling means for controlling said plant with said next plant input.

\* \* \* \* \*